United States Patent
Jafri

(10) Patent No.: US 12,248,997 B2
(45) Date of Patent: *Mar. 11, 2025

(54) PURCHASING A TRAVEL PACKAGE VIA A COMMUNICATION NETWORK

(71) Applicant: Onriva LLC, Foster City, CA (US)

(72) Inventor: Vajid Jafri, Redwood Shores, CA (US)

(73) Assignee: Onriva LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,734

(22) Filed: Dec. 12, 2023

(65) Prior Publication Data
US 2024/0112287 A1 Apr. 4, 2024

Related U.S. Application Data

(63) Continuation of application No. 17/513,803, filed on Oct. 28, 2021, now Pat. No. 11,900,489, which is a continuation of application No. 15/498,474, filed on Apr. 27, 2017, now Pat. No. 11,188,990.

(60) Provisional application No. 62/330,799, filed on May 2, 2016.

(51) Int. Cl.
*G06Q 50/14* (2012.01)
*G06Q 10/02* (2012.01)

(52) U.S. Cl.
CPC ............. *G06Q 50/14* (2013.01); *G06Q 10/02* (2013.01)

(58) Field of Classification Search
CPC ....................................................... G06Q 10/02
USPC ............................................................ 705/5
See application file for complete search history.

(56) References Cited

U.S. PATENT DOCUMENTS

| | | | |
|---|---|---|---|
| 9,288,270 B1* | 3/2016 | Penilla | H04L 67/141 |
| 2014/0114705 A1* | 4/2014 | Bashvitz | G06Q 10/1093 705/5 |
| 2016/0239765 A1 | 8/2016 | Pasero et al. | |
| 2016/0364815 A1* | 12/2016 | Miller | G06F 16/248 |

OTHER PUBLICATIONS

"Personalized Travel Package Recommendation" Published by IEEE (Year: 2011).*
Crespo-Almendros, E. et al. "Online airline ticket purchasing: Influence of online sales promotion type and Internet experience," *Journal of Air Transport Management*, vol. 53, Jun. 1, 2016, pp. 23-34.
United States Office Action, U.S. Appl. No. 17/513,803, filed Feb. 6, 2023, 13 pages.

* cited by examiner

*Primary Examiner* — Zeina Elchanti
(74) *Attorney, Agent, or Firm* — Fenwick & West LLP

(57) ABSTRACT

A matrix format with one dimension showing categories of the flights and one dimension showing ranges of the categories can be used by a customer looking for a travel flight. The selection of the customer on the flight matrix can be converted to travel preferences, which can be stored in a travel preference profile of the customer. The travel preference profile can be updated when the customer searches and books travel flights. Ultimately, the travel preference profile can reflect the customer desires and subsequent travel searches can results in a small number of, preferable only one, flight itineraries most suitable to the customer.

20 Claims, 19 Drawing Sheets

| Price | Depart | Arrival | Travel time | Layover time | Airline |
|---|---|---|---|---|---|
| 200 - 300 | 8AM – 10AM | 8AM – 10AM | 2 – 4 HRS | 0 - 2 HRS | United |
| 300 - 400 | 10AM – 12PM | 10AM – 12PM | 4 – 6 HRS | 2 - 4 HRS | AA |
| 400 - 500 | 12AM – 2PM | 12AM – 2PM | 6 – 8 HRS | 4 - 6 HRS | Delta |
| 500 - 600 | 2PM – 4PM | 2PM – 4PM | 8 – 10 HRS | 6 - 8 HRS | Southwest |
|  |  |  |  |  |  |

*FIG. 1A*

Receiving a search input for a travel plan
180

Displaying search results in a matrix format, wherein columns of the matrix represent different categories of flight itineraries resulted from the search, wherein rows of the matrix represent different data for the categories
181

| Price | Depart | Arrival | Travel time | Layover time | Airline |
|---|---|---|---|---|---|
| 200 - 300 | 8AM – 10AM | 8AM – 10AM | 2 – 4 HRS | 0 - 2 HRS | United |
| 300 - 400 | 10AM – 12PM | 10AM – 12PM | 4 – 6 HRS | 2 - 4 HRS | AA |
| 400 - 500 | 12AM – 2PM | 12AM – 2PM | 6 – 8 HRS | 4 - 6 HRS | Delta |
| 500 - 600 | 2PM – 4PM | 2PM – 4PM | 8 – 10 HRS | 6 - 8 HRS | Southwest |

| Price | Depart | Arrival |
|---|---|---|
| 200 - 300 | 8AM – 10AM | 8AM – 10AM |
| 300 - 400 | 10AM – 12PM | 10AM – 12PM |
| 400 - 500 | 12AM – 2PM | 12AM – 2PM |
| 500 - 600 | 2PM – 4PM | 2PM – 4PM |

| Price | Depart | Arrival |
|---|---|---|
| 200 - 300 | 8AM – 10AM | 8AM – 10AM |
| 300 - 400 | 10AM – 12PM | 10AM – 12PM |
| 400 - 500 | 12AM – 2PM | 12AM – 2PM |
| 500 - 600 | 2PM – 4PM | 2PM – 4PM |

| Price | Depart | Arrival | Travel time | Layover time | Airline |
|---|---|---|---|---|---|
| 200 - 300 | 8AM – 10AM | 8AM – 10AM | 2 – 4 HRS | 0 - 2 HRS | United |
| 300 - 400 | 10AM – 12PM | 10AM – 12PM | 4 – 6 HRS | 2 - 4 HRS | AA |
| 400 - 500 | 12AM – 2PM | 12AM – 2PM | 6 – 8 HRS | 4 - 6 HRS | Delta |
| 500 - 600 | 2PM – 4PM | 2PM – 4PM | 8 – 10 HRS | 6 - 8 HRS | Southwest |

| Price | Depart | Arrival | Travel time | Layover time | Airline |
|---|---|---|---|---|---|
| 200 - 300 | 8AM – 10AM | 8AM – 10AM | 2 – 4 HRS | 0 - 2 HRS | United |
| 300 - 400 | 10AM – 12PM | 10AM – 12PM | 4 – 6 HRS | 2 - 4 HRS | AA |
| 400 - 500 | 12AM – 2PM | 12AM – 2PM | 6 – 8 HRS | 4 - 6 HRS | Delta |
| 500 - 600 | 2PM – 4PM | 2PM – 4PM | 8 – 10 HRS | 6 - 8 HRS | Southwest |

| Price | Depart | Arrival | Travel time | Layover time | Airline |
|---|---|---|---|---|---|
| 200 - 300 | 8AM – 10AM | 8AM – 10AM | 2 – 4 HRS | 0 - 2 HRS | United |
| 300 - 400 | 10AM – 12PM | 10AM – 12PM | 4 – 6 HRS | 2 - 4 HRS | AA |
| 400 - 500 | 12AM – 2PM | 12AM – 2PM | 6 – 8 HRS | 4 - 6 HRS | Delta |
| 500 - 600 | 2PM – 4PM | 2PM – 4PM | 8 – 10 HRS | 6 - 8 HRS | Southwest |

| Price | Depart | Arrival | Travel time | Layover time | Airline |
|---|---|---|---|---|---|
| 200 - 300 | 8AM – 10AM | 8AM – 10AM | 2 – 4 HRS | 0 - 2 HRS | United |
| 300 - 400 | 10AM – 12PM | 10AM – 12PM | 4 – 6 HRS | 2 - 4 HRS | AA |
| 400 - 500 | 12AM – 2PM | 12AM – 2PM | 6 – 8 HRS | 4 - 6 HRS | Delta |
| 500 - 600 | 2PM – 4PM | 2PM – 4PM | 8 – 10 HRS | 6 - 8 HRS | Southwest |

| Price | Depart | Airport | Arrival | Airport | Travel time |
|---|---|---|---|---|---|
| 200 - 300 | 8AM – 10AM | JFK | 8AM – 10AM | IAH | 2 – 4 HRS |
| 300 - 400 | 10AM – 12PM | LGA | 10AM – 12PM | HOU | 4 – 6 HRS |
| 400 - 500 | 12AM – 2PM | EWR | 12AM – 2PM | | 6 – 8 HRS |
| 500 - 600 | 2PM – 4PM | | 2PM – 4PM | | 8 – 10 HRS |
| | | | | | |

*FIG. 9A*

| Price | Depart | Arrival | Travel time | Layover time | Airline |
|---|---|---|---|---|---|
| 200 - 300 | JAN 1 - 2 | JAN 1 - 2 | 2 – 4 HRS | 0 - 2 HRS | United |
| 300 - 400 | JAN 3 - 4 | JAN 3 - 4 | 4 – 6 HRS | 2 - 4 HRS | AA |
| 400 - 500 | JAN 5 - 6 | JAN 5 - 6 | 6 – 8 HRS | 4 - 6 HRS | Delta |
| 500 - 600 | JAN 7 - 8 | JAN 7 - 8 | 8 – 10 HRS | 6 - 8 HRS | Southwest |
| | | | | | |

| Price | Depart | Arrival | Travel time | Layover time | Airline |
|---|---|---|---|---|---|
| 200 - 300 | 8AM – 10AM | 8AM – 10AM | 2 – 4 HRS | 0 - 2 HRS | United |
| 300 - 400 | 10AM – 12PM | 10AM – 12PM | 4 – 6 HRS | 2 - 4 HRS | AA |
| 400 - 500 | 12AM – 2PM | 12AM – 2PM | 6 – 8 HRS | 4 - 6 HRS | Delta |
| 500 - 600 | 2PM – 4PM | 2PM – 4PM | 8 – 10 HRS | 6 - 8 HRS | Southwest |

| Price | Depart | Arrival | Travel time | Layover time | Airline |
|---|---|---|---|---|---|
| 200 - 300 | 8AM – 10AM | 8AM – 10AM | 2 – 4 HRS | 0 - 2 HRS | United |
| 300 - 400 | 10AM – 12PM | 10AM – 12PM | 4 – 6 HRS | 2 - 4 HRS | AA |
| 400 - 500 | 12AM – 2PM | 12AM – 2PM | 6 – 8 HRS | 4 - 6 HRS | Delta |
| 500 - 600 | 2PM – 4PM | 2PM – 4PM | 8 – 10 HRS | 6 - 8 HRS | Southwest |

| Price | Depart | Arrival | Travel time | Layover time | Airline |
|---|---|---|---|---|---|
| 300 | 10AM | 4PM | 6 HRS | 2 HRS | AA |
| | | | | | United |
| 400 | 10AM | 3PM | 5 HRS | 1 HRS | AA |

| Price | Depart | Arrival | Travel time | Layover time | Airline |
|---|---|---|---|---|---|
| 300 | 10AM | 12PM | 2 HRS | 2 HRS | AA |
| | 2PM | 4PM | 2 HRS | 0 HRS | United |
| 400 | 10AM | 11AM | 1 HR | 1 HR | AA |
| | 12PM | 3PM | 3 HRS | 0 HRS | AA |

| Price | Depart | Arrival | Travel time | Layover time | Airline |
|---|---|---|---|---|---|
| 300 | 1/1/15 10AM SFO Term 1 Seat 4A | 1/1/15 12PM PHX Term 2 | 2 HRS | 2 HRS | AA |
| | 1/1/15 2PM PHX Term 2 Seat 7C | 1/1/15 4PM IAH Term 1 | 2 HRS | 0 HRS | AA |
| 400 | | | | | |

FIG. 12C

Price . . . . . . . . . . . . . . . . . . . . . . . . . . 7

. . . . . . .

Priority boarding . . . . . . . . . . . . . . . . 2

. . . . . . .

Layover time . . . . . . . . . . . . . . F(time)

Displaying search results of a travel plan so that flight itineraries that a customer is likely to select for purchase are listed first, wherein the order of the flight itineraries is based on a saved customer preference
1700

FIG. 17A

Displaying search results of a travel plan so that flight itineraries are ordered based on a saved customer preference, wherein the flight itineraries that the customer prefers are listed first
1720

FIG. 17B

Receiving a search input for a travel plan
1740

Displaying search results in a matrix format, wherein a first dimension comprises different categories of flight itineraries resulted from the search, wherein a second dimension comprises different data for the categories, wherein the categories and data are arranged according to a preference of a customer
1750

Updating the preference based on at least one of a selection and a final purchase of the customer
1760

FIG. 17C

PURCHASING A TRAVEL PACKAGE VIA A COMMUNICATION NETWORK

CROSS REFERENCE TO RELATED APPLICATIONS

This application is a continuation of application Ser. No. 17/513,803, filed Oct. 28, 2021, which is a continuation of application Ser. No. 15/498,474, filed Apr. 27, 2017, which claims the benefit of U.S. Provisional Application No. 62/330,799, filed May 2, 2016, each of which is hereby incorporated by reference in its entirety.

BACKGROUND

Airline reservation systems include a computerized system for storing and retrieving information and for conducting transactions related to air travel. With the advances of internet network, the airline reservation systems have been tailored to meet the customer demands, in which a customer can make reservation, purchase ticket, plan traveling trips, together with selecting other features such as upgrading, more leg room, redeeming frequent flyer miles, rebooking canceled flight, selecting seats, purchasing day club passes, priority boarding, and others.

There can be hundreds of flight itineraries in a search for a travel plan, which can make difficult the selection of a suitable flight itinerary. For example, there can be trade-offs between cost and comfort, such as lower price for longer layover time, or the unavailability of certain amenities such as early boarding or wifi connectivity.

Thus there is a need for improving the search procedures for finding optimal airline itineraries.

SUMMARY

In some embodiments, the present invention discloses methods, and systems and programs employing the methods, to provide travel agency services to customers. The methods can assist the customers in prioritizing the available flight itineraries, such as narrowing the number of flight itineraries to a small number, such as less than 5 or just one.

The methods can include forming and updating a travel preference profile by the actions of the customers, since the actions of the customers can provide a clear indication of the desire and preferences of the customers. Actual flight booking or simulated flight booking can be used in forming or updating the travel preference profile. Ultimately, the travel preference profile can assist in selecting the most suitable flight itinerary, among hundreds of available flight itineraries resulted in a search using inputs from the customers.

In some embodiments, a flight matrix with one dimension showing categories of the flights and one dimension showing ranges of the categories can be used to form association of the customers actions with the customer preferences.

BRIEF DESCRIPTION OF THE DRAWINGS

FIGS. 1A-1B illustrate a display configuration for the search results of a travel plan according to some embodiments.

FIGS. 2A-2C illustrate positive selection processes for a flight matrix according to some embodiments.

FIGS. 3A-3B illustrate positive selection processes for a flight matrix according to some embodiments.

FIGS. 5A-5B illustrate negative selection processes for a flight matrix according to some embodiments.

FIGS. 9A-9B illustrate expanded and contracted flight matrices according to some embodiments.

FIGS. 11A-11B illustrate a re-arrangement of flight matrices according to some embodiments.

FIGS. 12A-12C illustrate a re-arrangement of flight matrices according to some embodiments.

FIG. 16 illustrates a configuration of a travel profile according to some embodiments.

FIGS. 17A-17C illustrate flow charts for prioritizing flight itineraries according to some embodiments.

DETAILED DESCRIPTION

Figure 4:
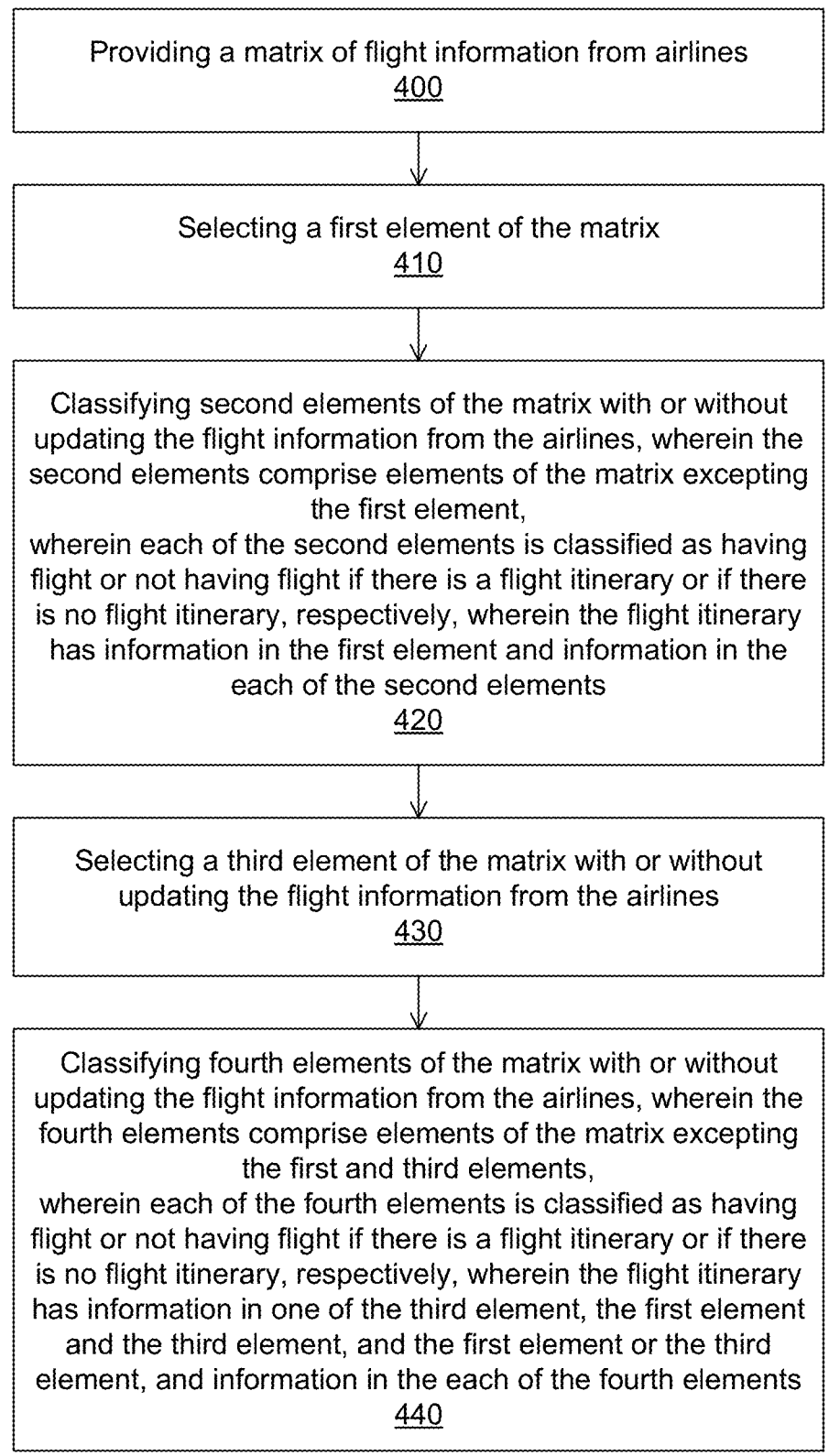
FIG. 4 illustrates a flow chart for multiple selections for a search for flight itineraries according to some embodiments.

In some embodiments, the present invention discloses methods, and systems and programs employing the methods, to provide travel agency services to customers. The travel agency services can display the search results of an inputted travel plan into different configurations and presentations, to allow the customer to compare characteristics of different flight itineraries in order to select the best suitable flight. For example, the customer can arrange the flight itineraries according to price or travel time, or the customer can identify certain criterions in order to emphasize or remove selected flight itineraries. The switching between different configurations and presentations can be performed using saved search results, without the need for updating for every single change. In addition, after a certain period, the search results can be automatically updated, allowing the customer to have access to the latest flight itineraries.

In some embodiments, the present invention discloses methods, and systems and programs employing the methods, to provide a personal travel agency service for a customer. The personal travel agency service can display the search results of an inputted travel plan according to a saved customer preference, thus can allow the most suitable flight itineraries to be displayed in prominent positions for ease of selection. For example, the most suitable flight itineraries can be displayed first, together with the most concerned features showing on the screen. Other flight itineraries can be seen by scrolling down the screen. Other features can be seen by scrolling the screen to the right.

In some embodiments, the present invention discloses methods, and systems and programs employing the methods, to provide travel agency services to customers. The travel agency services can display the flight itineraries of a travel plan into different configurations and presentations, together with allowing the customers to re-arrange and to filter the flight itineraries. The arrangeable and filterable display of the flight itineraries can allow the customers to select the optimum flight itinerary, e.g., the flight itinerary most suitable to the customers' needs.

The travel agency services can receive a travel plan as an input. The travel plan can include the date and places of traveling. For example, a customer can specify a departure and an arrival airport. Alternatively, the customer can specify a departure city and an arrival city, and the travel agency services can look up the nearby airports. In some embodiments, multiple airports can be used as input for the travel plan. For example, a customer can specify JFK airport or New York City as an arrival destination. The travel agency services can also include La Guardia airport and Newark airport, in addition to JFK airport, as the destination airport.

The travel agency services can perform a search for flight itineraries on the input date connecting the departure and arrival locations. The search results can be displayed in a multiple dimensional output such as a matrix. For example, one dimension of the multiple dimensional output, such as the columns of the matrix of the search results, can show different categories of the flight itineraries resulted from the search. The first column can show a first category, the second column can show the second category, until the last column showing the last category of the matrix. The categories can include price, departure time, date and airport, arrival time, date, and airport, travel time, layover time, number of flight segment, airlines, and other information such as early boarding, preferred seating, airline lounge access, lie-flat seats, wifi on international services, and new aircraft with more leg room.

Another dimension of the multiple dimensional output, such as the rows of the matrix of the search results, can show different data for the categories, such as different ranges or different values. Different elements, e.g., different rows, in a column of the matrix can show different data of the category representing in the column. For example, in the category of "price", different price ranges, such as 100-200, 200-300, etc., can be listed in different rows. In the airline category, different airline names, such as American Airlines, United, etc., can be listed in different rows.

Different display outputs can be used, such as a matrix having rows as categories and columns as data of the categories. The matrix can be two dimensional, with the columns of the matrix showing the categories of the matrix, and the rows of the matrix showing the data of the categories.

Folded matrix can be used, such as the categories can occupy two (or more) rows. The category can be split into two category lists. The odd row (first row, third row, etc.) can correspond to the first category list, and the even row (second row, fourth row, etc.) can correspond to the second category list.

Other display output formats can be used, such as a tile and bucket format. The search results can be displayed in multiple tiles, which can be configured in a two dimensional configuration, with each data in a bucket. The tile configuration can be similar to a matrix, with each bucket corresponds to an element of the matrix.

FIGS. 1A-1B illustrate a display configuration for the search results of a travel plan according to some embodiments. In FIG. 1A, the results of a search for a travel plan can be displayed in a matrix format 100. Different categories of the search results can be shown in columns 120, such as a price column, a departure column for showing the time of departure, or optionally a date or a range of dates of departure, an arrival column for showing the time of arrival, or optionally a date or a range of dates of arrival, a travel time column for showing the total travel time, a layover time for showing the waiting time between flight segments, an airline column for showing the name of the airlines operating the flight itineraries. Other categories can also be shown, such as the availability of flight amenities such as early boarding, preferred seating, airline lounge access, lie-flat seats, wifi on international services, and new aircraft with more leg room. In the figure, the categories are included for illustration purpose, and not a complete set of categories for flight itineraries. For example, the departure column can include the date of travel (including a range of the possible travel dates) and the departure airport, in addition to the time of travel. The travel time can be the flight time instead of the total travel time, e.g., the total travel time can be calculated by adding the flight time and the layover time. Additional columns representing additional categories can be included, such as departure and arrival airports.

The matrix 100 can include rows 110, which can show different data for different categories, e.g., columns 120 of the matrix. For example, row 1 of the column price, e.g., element 130 of matrix 100, which is the intersecting element of column 1 and row 1, shows the price range of 200-300, row 2 of the column price shows the price range of 300-400, etc. Similarly, row 1 of the column departure shows the time range of 8 am-10 am, row 2 of the column departure shows the time range of 10 am-12 am, etc. Alternatively, the departure column can show ranges of the dates, such as row 1 showing March 1st to March 2nd, row 2 showing March 3rd to March 4th, etc. Generally, the customer has decided on the date of travel, and thus the time ranges of that date can be shown, so that the customer can select the most suitable or desirable times. In some cases, there is no need for a precise travel date, and thus the customer can look for different flight itineraries for a range of dates, for example, to choose the best possible flight itineraries. Row 1 of the column airline show the airline United, row 2 of the column airline show the airline American Airlines, etc.

In some embodiments, the results of a search for a travel plan can be displayed in an alternative format, such as three dimensional matrices, e.g., the third dimension can be underneath or on top of the displayed 2d matrix. The third dimension matrices can be accessed, for example, by peeling away the top matrices. For example, the customer can slide the displayed matrix away to expose the under layer matrix. The results of a search for a travel plan can be displayed in a tile configuration, which can be similar to the matrix configuration. Information can be displayed in buckets of the tile configuration, with the buckets similar to the elements of the matrix.

FIG. 1B shows a flow chart for a display of search results of a travel plan input. Operation 180 receives a search input for a travel plan, such as a departure place, a destination place, and the time and date of the travel. A system can search for flight itineraries matching this information, e.g., finding flights on the specified date originating from the departure place to reach the destination place. Operation 181 displays the search results in a multi-dimensional configuration or presentation, such as a matrix or a tile/bucket format. For example, in a two-dimensional matrix format, the columns of the matrix can represent different categories of flight itineraries resulted from the search, and the rows of the matrix can represent different data for the categories. Alternatively, the rows can represent the categories and the columns the data of the categories.

In some embodiments, the matrix can be wrapped, meaning multiple rows can be used to represent the categories of flight itineraries. For example, a wrapped matrix with 2 adjacent rows can be used for a row dimension, e.g., x direction. The first row can include price, departure date and time, arrival date and time, flight time, travel time, layover time, and airlines. The second row can include other information, such as the availability of early boarding, preferred seating, airline lounge access, lie-flat seats, wifi on international services, and leg room dimension. Thus the odd rows of the matrix, e.g., row 3, row 5, etc., can include data for the first row, such as price range, departure time range, etc. The even rows of the matrix, e.g., row 4, row 6, etc., can include data for the second row, such as yes for early boarding, no for preferred seating, etc.

In some embodiments, matrix configurations with more than 2 dimensions can be used, such as three dimensional matrices, with the third dimension representing additional information from the search results.

In some embodiments, the display of the search results can be filtered to provide suitable flight itineraries according to a customer desire. For example, the flight matrix, e.g., the matrix containing information of the flight itineraries that are the results of the search for the travel plan, can be filtered, using a customer input, such as a saved customer preference or an interactive customer action, to remove elements of the flight matrix according to the customer input.

The customer input can be a positive input, e.g., a desired or a selected characteristic of flight itineraries, and thus flight itineraries not meeting the positive customer input can be removed. The customer input can be a negative input, e.g., a non-desired or an unselected characteristic of flight itineraries, and thus flight itineraries meeting the negative customer input can be removed. The removal can be performed by taking out the flight itineraries, or by making the corresponding flight itineraries not selectable or not viewable, such as graying out these flights.

The customer input can be a supersede input, meaning the current input can replace the earlier input. For example, a customer input can be a selection of United airlines. The flight matrix can be filtered to only show the flight itineraries of United airlines. A new input can be a selection of American airlines. If the new input is a supersede input, the selection of American airlines can replace the earlier selection of United airlines. The flight matrix can be filtered to show the flight itineraries of American airlines.

The customer input can be an OR input, meaning the previously filtered flight matrix having flights having the previous input can be enlarged to include flights having the current input. Or the flight matrix can be filtered with the previous input or the current input, e.g., the flight matrix can be filtered to provide flights having the previous input or the current input. For example, a customer input can be a selection of United airlines. The flight matrix can be filtered to only show the flight itineraries of United airlines. A new input can be a selection of American airlines. If the new input is an OR input, the flight matrix can be filtered to show the flight itineraries of both United airlines and American airlines, e.g., the customer input is to show flights from either United airlines or American airlines.

The customer input can be an AND input, meaning the previously filtered flight matrix having flights having the previous input can be narrowed to include flights having both the previous input and the current input. For example, a customer input can be a selection of United airlines. The flight matrix can be filtered to only show the flight itineraries of United airlines. A new input can be a selection of layover time less than 2 hours. If the new input is an AND input, the flight matrix can be filtered to show the flight itineraries of United airlines having layover time less than 2 hours.

FIGS. 2A-2C illustrate positive selection processes for a flight matrix according to some embodiments. A flight matrix can be a presentation of the search results for a travel plan. In the flight matrix, categories of the flight itineraries and data of the categories can be included, which can allow a customer to view the possible flight itineraries in a visual display. The flight matrix can include a list, e.g., a two dimensional list, of the characteristics of the flight itineraries resulted from the search results of the inputted travel plan.

The number of flight itineraries can be high, e.g., can be a hundred or two of possible flights connecting two locations at the date specified. Thus a selection of suitable flights can be performed to provide the optimum flights for the customer. The selection can be a positive selection, meaning selecting a desired characteristic of the flight itineraries. The selection can be a negative selection, meaning selecting a non-desired characteristic of the flight itineraries, or a characteristic that the selected flight itineraries should not have. In addition, multiple selections can be superseded, e.g., the subsequent selection supersedes the previous selection. The multiple selections can be OR selections, e.g., the selected flight itineraries can have the characteristics specified in either selections, or the selected flight itineraries need to satisfy only one selection characteristic. The multiple selections can be AND selections, e.g., each of the selected flight itineraries will have all characteristics specified by the multiple selections.

FIG. 2A shows a flight matrix 200, together with a positive selection 220. The flight matrix 200 can present a list of characteristics of possible flight itineraries, for example, the price ranges, the departure time, the arrival time, the travel time, the layover time, the airlines operating the flight, etc. A selection 220 can be performed, which can be a positive selection. There can be a menu, not shown, listing the choices of selection, such as positive, negative, supersede, OR, and AND selections. For example, the menu can be shown next to the flight matrix, with the default choice for the selection highlighted. Alternatively, after selecting an element of the matrix, a menu can be popped-up, asking for the choice of selections.

A positive selection 220 can be performed for an element of the matrix, such as selecting a departure time of between 10 and 12 in the morning. The flight itineraries that do not meet the selection, e.g., the flights that do not depart between 10 and 12, can be removed from the flight matrix or can be removed from being further selected. The flight itineraries that meet the selection, e.g., the flights that depart between 10 and 12, can remain or can be highlighted, for example, for further selection.

For example, after the selection of element 10 AM-12 AM on departure category, elements 224 can be grayed out, meaning there is no Southwest flights departing between 10 and 12. The remaining elements 222 can stay the same. Thus the flight matrix has been filtered, separating the flights meeting the selection characteristics and the flights not meeting the selection characteristics. Other formats can be used for the separation of flights meeting and not meeting the selections, such as highlighting the flights elements meeting selection characteristics (such as highlighting element 222), and leaving alone the elements not meeting selection characteristics (such as not touching or not changing element 224).

FIG. 2B shows an OR selection of the flight matrix. The element 220A can be first selected, and the matrix sorted according to the selection. Then an OR selection 230 can be performed. The matrix can be re-sorted according to the combination of the two selections. The selections can be OR, meaning, flights meeting either selections can be selected and flights not meeting both selections can be removed. Thus new flights can be added, or new elements of the flight matrix can be selected. For example, with the additional selection of 12-2 departure time, there can be flights with the price range of 400-500, and the element 232 can be selected as containing flights meeting the selection characteristics.

FIG. 2C shows a supersede selection of the flight matrix. The element 220B can be first selected, and the matrix sorted according to the selection. Then a supersede selection 235 can be performed. The matrix can be re-sorted according to the new selection 235. The selections can supersede, meaning, the previous selection is removed, with the subsequent selection replacing the precious selection. For example, with the change from the previous selection of 10-12 departure time to the subsequent selection of 12-2 departure time, there can be flights with the price range of 400-500, and the element of price range 400-500 can be selected as containing flights meeting the selection characteristics. There won't be flights with the price range of 300-400, and the element of price range 300-400 can be removed as containing flights not meeting the selection characteristics.

FIGS. 3A-3B illustrate positive selection processes for a flight matrix according to some embodiments. FIG. 3A shows an AND selection of the flight matrix. The element 320A can be first selected, and the matrix sorted according to the selection. Then an AND selection 340 can be performed. The matrix can be re-sorted according to the combination of the two selections. The selections can be AND, meaning, flights meeting both selections can be selected and flights not meeting either selection can be removed. Thus additional flights can be removed, or new elements of the flight matrix can be de-selected, e.g., removed from selectable flights itineraries. For example, with the additional selection 340 of 2-4 hour travel time, there won't be flights with the price range of 300-400, and the element 344 of price range 300-400 can be removed as containing flights not meeting the selection characteristics.

FIG. 3B shows an OR selection of the flight matrix. The element 320B can be first selected, and the matrix sorted according to the selection. Then an OR selection 330 can be performed. The matrix can be re-sorted according to the combination of the two selections. The selections can be OR, meaning, flights meeting either selections can be selected and flights not meeting both selections can be removed. Thus new flights can be added, or new elements of the flight matrix can be selected. For example, with the additional selection 330 of 2-4 hour travel time, there can be flights with the price range of 400-500, and the element 332 can be selected as containing flights meeting the selection characteristics.

FIG. 4 illustrates a flow chart for multiple selections for a search for flight itineraries according to some embodiments. The process can be for multiple positive selections, e.g., selecting flights having the desired characteristics. The flow chart can be for a positive selection, e.g., selecting flights having the selected characteristics, followed by another positive selection. Other sequences, such as a negative selection followed by a positive selection, a negative selection followed by another negative selection, and a positive selection followed by a negative selection, can be described in subsequent sections.

Operation 400 provides a matrix of flight information from airlines. The flight matrix can be the results of a search on the airline database, based on an input provided by a customer.

Operation 410 selects a first element of the matrix, for example, as an input from the customer. The selection can be marked as positive selection, meaning the selection is for desired characteristics of the suitable flights. The marking can be automatic, e.g., inherited from a previous selection characteristic. The marking can be manual, e.g., the customer can mark a menu, stating that the current selection is positive. Alternatively, after making the selection, a menu can pop up, asking for a choice of characteristics of the current selection, such as positive selection, negative selection, supersede selection, AND selection, or OR selection. For example, a first element can include a choice for preferred airlines, such as Southwest airline.

Operation 420 classifies second elements of the matrix, e.g., determining whether or not the other elements of the matrix satisfy the criterion of the selected first element. The second elements of the matrix can include all elements in the matrix except the first element, e.g., excepting the elements that have been selected.

The classification can be performed with or without updating the flight information from the airlines. For example, the search results can be saved in a server, and thus the subsequent actions of selecting and classification of the display matrix can be based on the saved search results. The saved search results can eliminate or minimize any delays, for example, in performing the search again. Periodically, the search can be re-performed, to update the flight information against any changes. For example, the search can be performed after every five minutes or ten minutes. The search can be performed in the background, thus for the customer, the performance of the travel agency services can be instantaneous. In contrast to a search performed immediately after a selection of the customer (which would make the customer waiting for the search results), a background search can be performed before the customer indicating the selection (which would make the customer seeing an instantaneous display right after the selection). The background search can be based on a prediction algorithm, such as it is highly likely that the customer would select a "NEXT" choice, and thus a search based on the NEXT criterion can be performed while the customer browses through the current screen. The background search can be based on a profile or preferences of the customer, to predict the possible selections of the customer. For example, a customer has indicated that he is of a frugal traveler type, thus a search based on a selection of "non luxury" price range can be pre-performed. The background search can include a broad search, e.g., encompassing many of the possible selections, thus when an actual selection is made, a search can be performed on the broad search, which can be faster than performing on the whole database.

The classification can be to mark the second elements as having flight or not having flight. For example, the second element is marked as having flight if there is a flight itinerary that has information in the first element and information in the second element. For example, if the first element selected is Southwest airline, then a second element of departure time between 10 and 12 can be marked as having flight if there is a Southwest flight departing between 10 and 12.

The second element can be marked as not having flight if there is no flight itinerary that has information in the first element and information in the second element. For example, if the first element selected is Southwest airline, then a second element of departure time between 2 and 4 can be marked as not having flight if there is no Southwest flights departing between 2 and 4.

In some embodiments, the marking of the second elements can be performed on the display matrix or on the saved search results of flight itineraries. Thus there is no updating of flight information, and the performance of the server can be instantaneous.

Operation 430 selects a third element of the matrix with or without updating the flight information from the airlines, for example, as an input from the customer.

Operation 440 classifies fourth elements of the matrix with or without updating the flight information from the airlines. The fourth elements can include elements of the matrix excepting at least the third element, and including the second elements in some cases. For example, if the third element is operable to replace the first element, e.g., the third element is a supersede element, then the fourth elements can include elements of the matrix excepting the third element, e.g., including the second elements, e.g., changing the classification of the second elements to meet the criterion of the third element. For example, the first element can be Southwest airline, e.g., the customer desires to find Southwest airline flights for traveling, for example, due to frequent flier concern. The customer can change his selection, e.g., using a next selection of the third element to replace the previous selection of the first element, by selecting United Airlines as the third element with the identification of the third element being the superseded element. The first element of Southwest airline can then be subjected to the selection of United airlines, e.g., the fourth elements can include the first element, and can be classified as not satisfying the criterion of being an United airlines flight. In some cases, if the two airlines are partnered, e.g., codeshare flights, then both airlines can be classified as being from either airline. The second elements that have been classified based on the selection of Southwest airline, can be reclassified to reflect the selection change, e.g., classified based on the new selection of United airlines.

If the third element is operable to be combined with the first element, e.g., the third element is an AND or an OR element, then the fourth elements can include elements of the matrix excepting the first and the third elements, e.g., including the second elements, e.g., changing the classification of the second elements to meet the criterion of the combination of the first and third elements. For example, the first element can be Southwest airline, e.g., the customer desires to find Southwest airline flights for traveling, for example, due to frequent flier concern. The customer can change his selection, e.g., adding a next selection of the third element to the previous selection of the first element, by selecting United Airlines as the third element with the identification of the third element being the OR element. The first element of Southwest airline can then be subjected to the selection of United airlines, e.g., the fourth elements can include the first element, and can be classified as not satisfying the criterion of being an United airlines flight. In some cases, if the two airlines are partnered, e.g., codeshare flights, then both airlines can be classified as being from either airline. The second elements that have been classified based on the selection of Southwest airline, can be reclassified to reflect the selection change, e.g., classified based on the new selection of United airlines.

The classification can be to mark the fourth elements as having flight or not having flight. For example, the fourth element is marked as having flight if there is a flight itinerary that has information in the fourth element, and information in one of the third element, the first element and the third element, and the first element or the third element. Thus there can be three cases for the selection of the third element, which are supersede selection (using information in the third element), AND selection (using information in the first element and the third element) and OR selection (using information in the first element or the third element).

For example, the selection of the third element can supersede the selection of the first element. Thus information in the first element can be ignored and replaced with the information in the third element. The fourth elements of the matrix, e.g., elements of the matrix except the third element, can be classified using the information in the third element and in the fourth elements. For example, if the third element selected is Southwest airline, then a fourth element of departure time between 10 and 12 can be marked as having flight if there is a Southwest flight departing between 10 and 12 Similarly, if the third element selected is Southwest airline, then a fourth element of departure time between 2 and 4 can be marked as not having flight if there is no Southwest flights departing between 2 and 4.

The selection of the third element can be an AND selection with the first element. Thus information in the first element can be and-combined with the information in the third element. The fourth elements of the matrix, e.g., elements of the matrix except the first and third element, can be classified using the combination of information in the first and third elements and the information in the fourth elements. For example, if the first element selected is price range of 400-500, and the third element selected is Southwest airline, then a fourth element of departure time between 10 and 12 can be marked as having flight if there is a Southwest flight departing between 10 and 12 and costs between 400 and 500 Similarly, if the first element selected is price range of 400-500, and the third element selected is Southwest airline, then a fourth element of departure time between 2 and 4 can be marked as not having flight if there is no Southwest flights departing between 2 and 4 and costs between 400 and 500.

The selection of the third element can be an OR selection with the first element. Thus information in the first element can be or-combined with the information in the third element. The fourth elements of the matrix, e.g., elements of the matrix except the first and third element, can be classified using the combination of information in the first or third elements and the information in the fourth elements. For example, if the first element selected is price range of 400-500, and the third element selected is Southwest airline, then a fourth element of departure time between 10 and 12 can be marked as having flight if there is a Southwest flight departing between 10 and 12 or if there is a flight departing between 10 and 12 and costs between 400 and 500. Similarly, if the first element selected is price range of 400-500, and the third element selected is Southwest airline, then a fourth element of departure time between 2 and 4 can be marked as not having flight if there is no Southwest flights departing between 2 and 4 and if there is no flights departing between 2 and 4 and costs between 400 and 500.

FIGS. 5A-5B illustrate negative selection processes for a flight matrix according to some embodiments. In a negative selection process, the selected element can be considered as an undesired characteristic of suitable flight itineraries. Alternatively, the negative selected element can be considered as having lowest priority in the list of suitable flight itineraries. Thus when a negative selection is performed, all flight itineraries that contain the information in the negative element can be removed from the flight matrix.

In FIG. 5A, a flight matrix 500 can show the categories and data of the categories for the search results of a travel plan. The element 520 of 10-12 departure time can be unselected, e.g., negative selection, or selected to be not a desired characteristic of suitable flight itineraries. The matrix can be filtered, e.g., other elements of the matrix can be marked as having flight or not having flight according to the selection 520. For example, element 522 can be marked as having flight, such as highlighting the element or remaining an unaffected element, if there is a flight at a price range of 500-600 that departs at a time different than the time range 10-12. The element 524 can be marked as not having flight, such as remaining an unaffected element if the element 522 is highlighted, or grayed out if the element 522 remains unaffected, if there is no flight having a layover of 4-6 hours and departing at a time different than the 10-12.

Subsequent selections can be positive or negative selections. Further, the subsequent selections can be supersede selections, e.g., replacing the previous selections, AND selections, e.g., flights must satisfy both selections, and OR selections, e.g., flights that can satisfy either selections.

FIG. 5B shows a subsequent selection 540 that has a positive characteristic and an AND characteristic. Since the subsequent selection is positive, the selected flights will be United flights. Since the subsequent selection is an AND selection, the selected flights will be United flights and flights not departing between 10 and 12. For example, the remaining elements 544 in category airline can be marked as not having flight, since United airline is selected as chosen flight carrier. The element 522 can be marked as having flight, if there is a United flight departing at a time different than the 10-12, and costs between 500 and 600.

Figure 6:
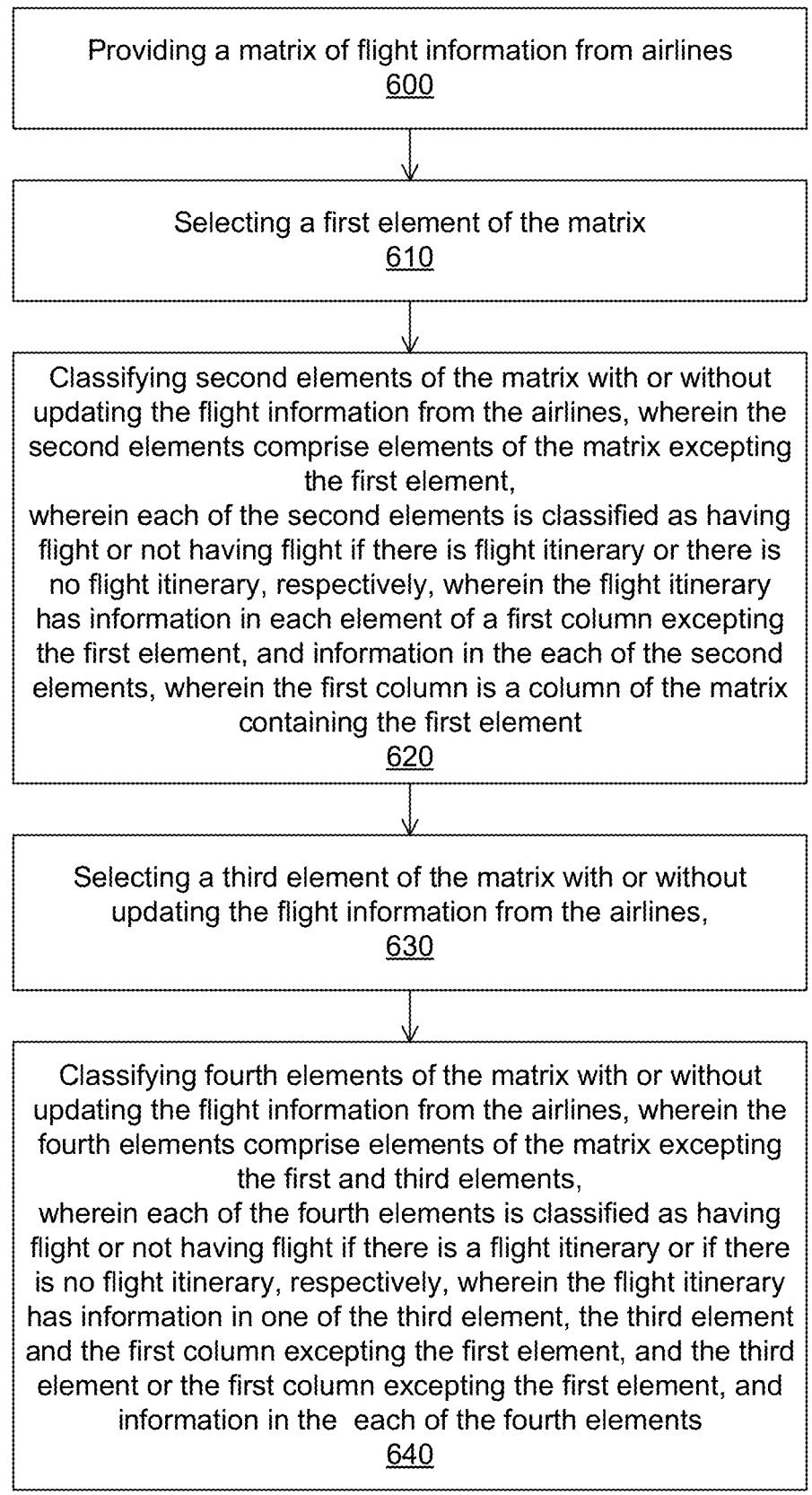
FIG. 6 illustrates a flow chart for multiple selections for a search for flight itineraries according to some embodiments.

FIG. 6 illustrates a flow chart for multiple selections for a search for flight itineraries according to some embodiments. The process can be for a negative selection, e.g., selecting flights not having the selected characteristics, followed by a positive selection, e.g., selecting flights having the selected characteristics.

Operation 600 provides a matrix of flight information from airlines. The flight matrix can be the results of a search on the airline database, based on an input provided by a customer.

Operation 610 selects a first element of the matrix. The selection can be marked as a negative selection, meaning the selection is for undesired characteristics or for avoidable flight characteristics of the suitable flights.

Operation 620 classifies second elements of the matrix. The second elements of the matrix can include all elements in the matrix except the first element, e.g., excepting the elements that have been selected.

The classification can be performed with or without updating the flight information from the airlines. For example, the search results can be saved in a server, and thus the subsequent actions of selecting and classification of the display matrix can be based on the saved search results. The saved search results can eliminate or minimize any delays, for example, in performing the search again. Periodically, the search can be re-performed, to update the flight information against any changes. For example, the search can be performed after every five minutes or ten minutes. The search can be performed in the background, thus for the customer, the performance of the travel agency services can be instantaneous.

The classification can be to mark the second elements as having flight or not having flight. For example, the second element is marked as having flight if there is a flight itinerary that has information in any element of a first column, except the first element and information in the second element. The first column can be the column containing the first element, e.g., all elements of the matrix containing a negative information as compared to the information in the first element. For example, the first element can be Southwest airlines, then the first column can be the airline column or category, which containing all the airlines that the search results can find. In this description, it is assumed that the matrix is ordered with category being the column. Thus, if the first element selected is Southwest airline, e.g., a negative selection of Southwest airline, e.g., the available flights are not from Southwest airline, then a second element of departure time between 10 and 12 can be marked as having flight if there is a non-Southwest flight, e.g., United airlines, American airlines, etc., departing between 10 and 12.

The second element can be marked as not having flight if there is no flight itinerary that has information in any element of the first column except the first element and information in the second element. For example, if the first element selected is Southwest airline, then a second element of departure time between 2 and 4 can be marked as not having flight if there is no non-Southwest flights departing between 2 and 4. In other words, the second element can be marked as not having flight if the only flight itineraries available are flight itineraries that has information in the second element and information in the first element. For example, if the first element selected is Southwest airline, then a second element of departure time between 2 and 4 can be marked as not having flight if the only flight itineraries available are Southwest flights departing between 2 and 4.

In some embodiments, the marking of the second elements can be performed on the display matrix or on the saved search results of flight itineraries. Thus there is no updating of flight information, and the performance of the server can be instantaneous.

Operation 630 selects a third element of the matrix with or without updating the flight information from the airlines. In the following description, the third element can be a positive selection element, and thus the classification of the flights can be based on a criterion of having the element of the third element. If the third element can be a negative selection element, then appropriate classification of the flights can be performed based on the criterion of not having the element of the third element.

Operation 640 classifies fourth elements of the matrix with or without updating the flight information from the airlines. The fourth elements can include elements of the matrix excepting at least the third element. For example, if the third element is operable to replace the first element, e.g., the third element is a supersede element, then the fourth elements can include elements of the matrix excepting the third element. If the third element is operable to be combined with the first element, e.g., the third element is an AND or an OR element, then the fourth elements can include elements of the matrix excepting the first and the third elements.

The classification can be to mark the fourth elements as having flight or not having flight. For example, the fourth element is marked as having flight if there is a flight itinerary that has information in the fourth element, and information in one of the third element, the third element and the first column excepting the first element, and the third element or the first column excepting the first element. Thus there can be three cases for the selection of the third element, which are supersede selection (using information in the third element), AND selection (using information in the third element and the first column excepting the first element) and OR selection (using information in the third element or the first column excepting the first element).

For example, the selection of the third element can supersede the selection of the first element. Thus information in the first element can be ignored and replaced with the information in the third element. The fourth elements of the matrix, e.g., elements of the matrix except the third element, can be classified using the information in the third element and in the fourth elements. For example, if the third element selected is Southwest airline, then a fourth element of departure time between 10 and 12 can be marked as having flight if there is a Southwest flight departing between 10 and 12 Similarly, if the third element selected is Southwest airline, then a fourth element of departure time between 2 and 4 can be marked as not having flight if there is no Southwest flights departing between 2 and 4.

The selection of the third element can be an AND selection, e.g., an AND selection between the third element and the elements in a first column except the first element. The first column can be the column containing the first element. Thus information in the third element can be and-combined with the information in the elements of the first column excepting the first element. The fourth elements of the matrix, e.g., elements of the matrix except the first and third element, can be classified using the combination of information in the third element and the elements in the first column except the first element and the information in the fourth elements. For example, if the first element selected is price range of 400-500, and the third element selected is Southwest airline, then a fourth element of departure time between 10 and 12 can be marked as having flight if there is a Southwest flight departing between 10 and 12 and costs in any range except between 400 and 500 Similarly, if the first element selected is price range of 400-500, and the third element selected is Southwest airline, then a fourth element of departure time between 2 and 4 can be marked as not having flight if there is no Southwest flights departing between 2 and 4 and costs in any range except between 400 and 500. In other words, the fourth element of departure time between 2 and 4 can be marked as not having flight if the only Southwest flights departing between 2 and 4 costs between 400 and 500.

The selection of the third element can be an OR selection, e.g., an OR selection between the third element and the elements in a first column excepting the first element. The first column can be the column containing the first element. Thus information in the third element can be or-combined with the information in the elements of the first column excepting the first element. The fourth elements of the matrix, e.g., elements of the matrix except the first and third element, can be classified using the combination of information in the third element or the elements in the first column except the first element and the information in the fourth elements. For example, if the first element selected is price range of 400-500, and the third element selected is Southwest airline, then a fourth element of departure time between 10 and 12 can be marked as having flight if there is a Southwest flight departing between 10 and 12 or if there is a flight departing between 10 and 12 and costs in any range except between 400 and 500. Similarly, if the first element selected is price range of 400-500, and the third element selected is Southwest airline, then a fourth element of departure time between 2 and 4 can be marked as not having flight if there is no Southwest flights departing between 2 and 4 and if there is no flights departing between 2 and 4 and costs in any range except between 400 and 500.

Figure 7:
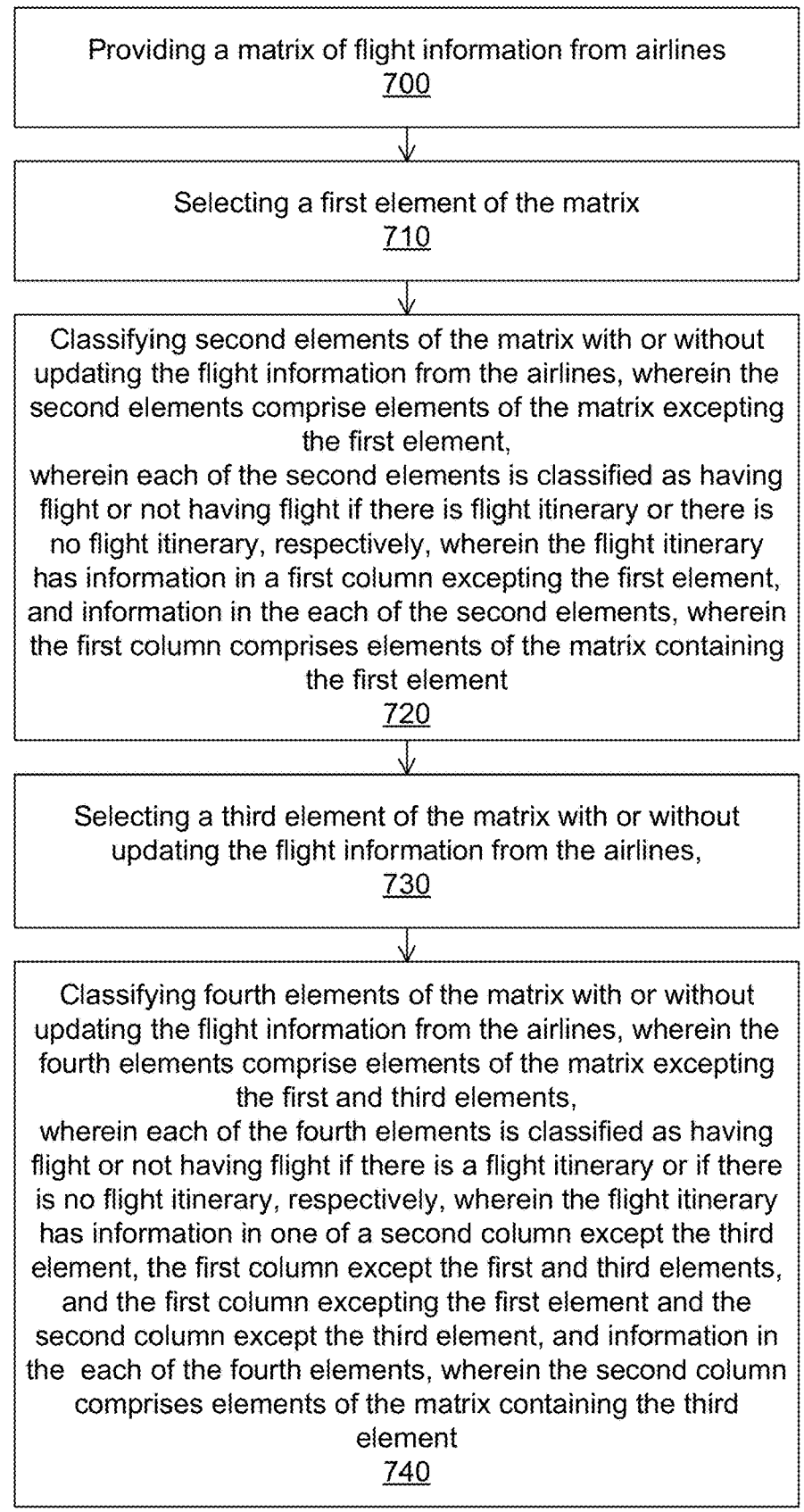
FIG. 7 illustrates a flow chart for multiple selections for a search for flight itineraries according to some embodiments.

FIG. 7 illustrates a flow chart for multiple selections for a search for flight itineraries according to some embodiments. The process can be for multiple negative selections, e.g., selecting flights not having the selected characteristics. The flow chart can be for a negative selection, e.g., selecting flights not having the selected characteristics, followed by another negative selection.

Operation 700 provides a matrix of flight information from airlines. The flight matrix can be the results of a search on the airline database, based on an input provided by a customer.

Operation 710 selects a first element of the matrix. The selection can be marked as a negative selection, meaning the selection is for undesired characteristics or for avoidable flight characteristics of the suitable flights.

Operation 720 classifies second elements of the matrix. The second elements of the matrix can include all elements in the matrix except the first element, e.g., excepting the elements that have been selected.

The classification can be performed with or without updating the flight information from the airlines. For example, the search results can be saved in a server, and thus the subsequent actions of selecting and classification of the display matrix can be based on the saved search results. The saved search results can eliminate or minimize any delays, for example, in performing the search again. Periodically, the search can be re-performed, to update the flight information against any changes. For example, the search can be performed after every five minutes or ten minutes. The search can be performed in the background, thus for the customer, the performance of the travel agency services can be instantaneous.

The classification can be to mark the second elements as having flight or not having flight. For example, the second element is marked as having flight if there is a flight itinerary that has information in any element of a first column except the first element and information in the second element. The first column can be the column containing the first element. For example, the first element can be Southwest airlines, then the first column can be the airline column or category, which containing all the airlines that the search results can find. Thus, if the first element selected is Southwest airline, then a second element of departure time between 10 and 12 can be marked as having flight if there is a non-Southwest flight, e.g., United airlines, American airlines, etc., departing between 10 and 12.

The second element can be marked as not having flight if there is no flight itinerary that has information in any element of a first column except the first element and information in the second element. The first column can be the column containing the first element. For example, if the first element selected is Southwest airline, then a second element of departure time between 2 and 4 can be marked as not having flight if there is no non-Southwest flights departing between 2 and 4. In other words, the second element can be marked as not having flight if the only flight itineraries available are flight itineraries that has information in the second element and information in the first element. For example, if the first element selected is Southwest airline, then a second element of departure time between 2 and 4 can be marked as not having flight if the only flight itineraries available are Southwest flights departing between 2 and 4.

In some embodiments, the marking of the second elements can be performed on the display matrix or on the saved search results of flight itineraries. Thus there is no updating of flight information, and the performance of the server can be instantaneous.

Operation 730 selects a third element of the matrix with or without updating the flight information from the airlines. The selection can be marked as a negative selection, meaning the selection is for undesired characteristics or for avoidable flight characteristics of the suitable flights.

Operation 740 classifies fourth elements of the matrix with or without updating the flight information from the airlines. The fourth elements can include elements of the matrix excepting at least the third element. For example, if the third element is operable to replace the first element, e.g., the third element is a supersede element, then the fourth elements can include elements of the matrix excepting the third element. If the third element is operable to be combined with the first element, e.g., the third element is an AND or an OR element, then the fourth elements can include elements of the matrix excepting the first and the third elements.

The classification can be to mark the fourth elements as having flight or not having flight. For example, the fourth element is marked as having flight if there is a flight itinerary that has information in the fourth element, and information in one of a second column excepting the third element, the second column excepting the third element AND a first column excepting the first element, and the second column excepting the third element OR the first column excepting the first element. The first column can be the column containing the first element. The second column can be the column containing the third element.

Thus there can be three cases for the selection of the third element, which are supersede selection (using information in the third element), AND selection (using information in the second column excepting the third element and the first column excepting the first element) and OR selection (using information in the second column excepting the third element or the first column excepting the first element).

For example, the selection of the third element can supersede the selection of the first element. Thus information in the first element can be ignored and replaced with the information in the third element. The fourth elements of the matrix, e.g., elements of the matrix except the third element, can be classified using the information in each of the second column excepting the third element and in the fourth elements. For example, if the third element selected is Southwest airline, then a fourth element of departure time between 10 and 12 can be marked as having flight if there is a non-Southwest flight departing between 10 and 12. Similarly, if the third element selected is Southwest airline, then a fourth element of departure time between 2 and 4 can be marked as not having flight if the only flight departing between 2 and 4 is Southwest flights.

The selection of the third element can be an AND selection, e.g., an AND selection between the elements in a second column excepting the third element and the elements in a first column excepting the first element. The first column can be the column containing the first element. The second column can be the column containing the third element. Thus information in the elements of the second column excepting the third element can be and-combined with the information in the elements of the first column excepting the first element. The fourth elements of the matrix, e.g., elements of the matrix except the first and third element, can be classified using the combination of information in the elements of the second column excepting the third element and the elements in the first column except the first element and the information in the fourth elements. For example, if the first element selected is price range of 400-500, and the third element selected is Southwest airline, then a fourth element of departure time between 10 and 12 can be marked as having flight if there is a non-Southwest flight departing between 10 and 12 and costs in any range except between 400 and 500 Similarly, if the first element selected is price range of 400-500, and the third element selected is Southwest airline, then a fourth element of departure time between 2 and 4 can be marked as not having flight if there is only Southwest flights departing between 2 and 4 and costs in any range except between 400 and 500, or if there is only non-Southwest flights departing between 2 and 4 and costs between 400 and 500.

The selection of the third element can be an OR selection, e.g., an OR selection between the elements in a second column excepting the third element and the elements in a first column excepting the first element. The first column can be the column containing the first element. The second column can be the column containing the third element. Thus information in the elements of the second column excepting the third element can be or-combined with the information in the elements of the first column excepting the first element. The fourth elements of the matrix, e.g., elements of the matrix except the first and third element, can be classified using the combination of information in the elements of the second column excepting the third element or the elements in the first column except the first element and the information in the fourth elements. For example, if the first element selected is price range of 400-500, and the third element selected is Southwest airline, then a fourth element of departure time between 10 and 12 can be marked as having flight if there is a Southwest flight departing between 10 and 12 or if there is a flight departing between 10 and 12 and costs in any range except between 400 and 500. Similarly, if the first element selected is price range of 400-500, and the third element selected is Southwest airline, then a fourth element of departure time between 2 and 4 can be marked as not having flight if there is no Southwest flights departing between 2 and 4 and if there is no flights departing between 2 and 4 and costs in any range except between 400 and 500.

Figure 8:
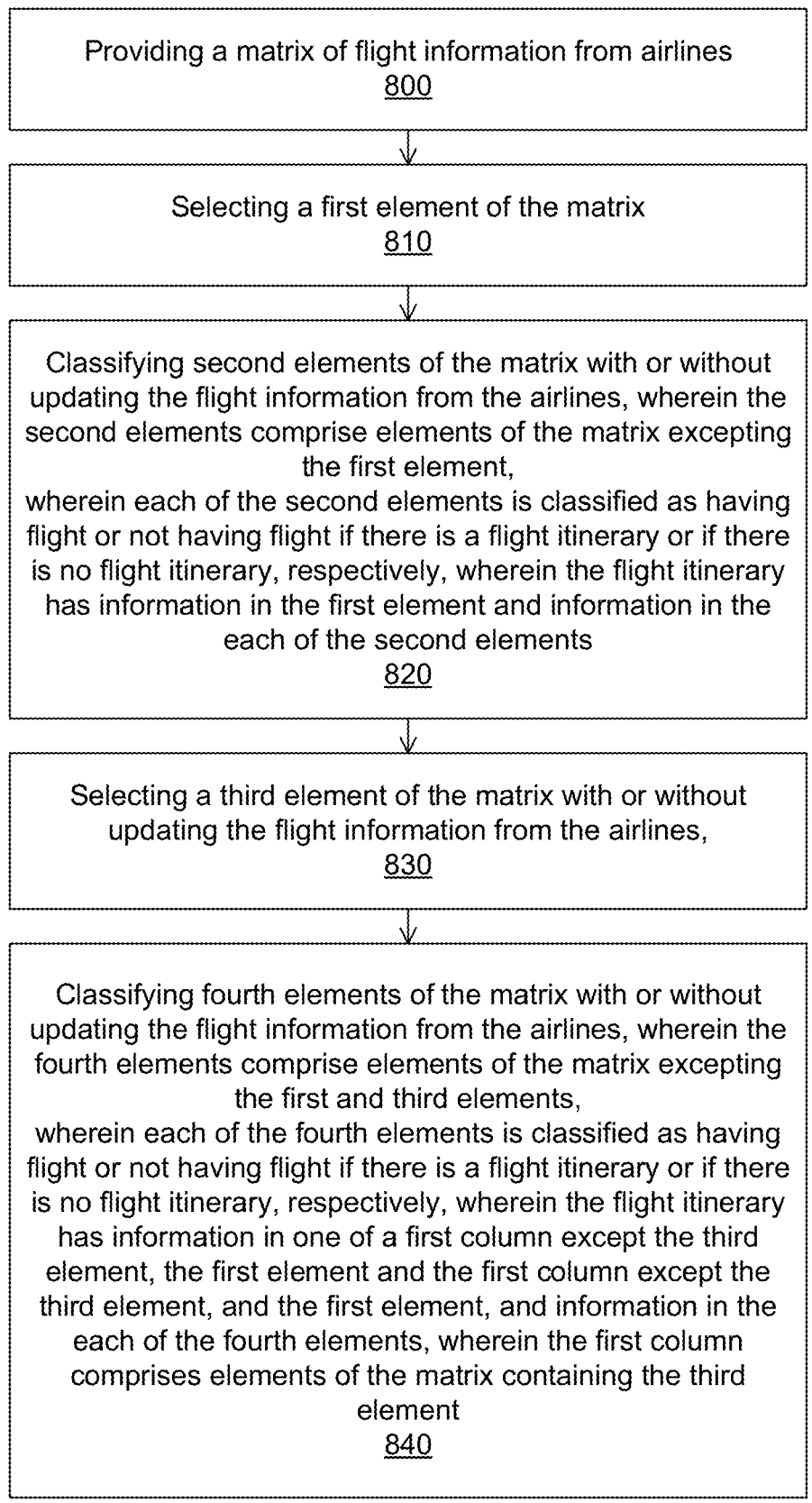
FIG. 8 illustrates a flow chart for multiple selections for a search for flight itineraries according to some embodiments.

FIG. 8 illustrates a flow chart for multiple selections for a search for flight itineraries according to some embodiments. The process can be for a positive selection, e.g., selecting flights having the selected characteristics, followed by a negative selection, e.g., selecting flights not having the selected characteristics.

Operation 800 provides a matrix of flight information from airlines. The flight matrix can be the results of a search on the airline database, based on an input provided by a customer.

Operation 810 selects a first element of the matrix. The selection can be marked as positive selection, meaning the selection is for desired characteristics of the suitable flights. In some embodiments, the selection can be marked as a negative selection, meaning the selection is for non-desired characteristics of the suitable flights. If the selection is a subsequent selection, other characteristics of the selection can be available, such as supersede, AND, and OR, in addition to positive and negative.

Operation 820 classifies second elements of the matrix. The second elements of the matrix can include all elements in the matrix except the first element, e.g., excepting the elements that have been selected.

The classification can be performed with or without updating the flight information from the airlines. For example, the search results can be saved in a server, and thus the subsequent actions of selecting and classification of the display matrix can be based on the saved search results. The saved search results can eliminate or minimize any delays, for example, in performing the search again. Periodically, the search can be re-performed, to update the flight information against any changes. For example, the search can be performed after every five minutes or ten minutes. The search can be performed in the background, thus for the customer, the performance of the travel agency services can be instantaneous.

The classification can be to mark the second elements as having flight or not having flight. For example, the second element is marked as having flight if there is a flight itinerary that has information in the first element and information in the second element. For example, if the first element selected is Southwest airline, then a second element of departure time between 10 and 12 can be marked as having flight if there is a Southwest flight departing between 10 and 12.

The second element can be marked as not having flight if there is no flight itinerary that has information in the first element and information in the second element. For example, if the first element selected is Southwest airline, then a second element of departure time between 2 and 4 can be marked as not having flight if there is no Southwest flights departing between 2 and 4.

In some embodiments, the marking of the second elements can be performed on the display matrix or on the saved search results of flight itineraries. Thus there is no updating of flight information, and the performance of the server can be instantaneous.

Operation 830 selects a third element of the matrix with or without updating the flight information from the airlines.

Operation 840 classifies fourth elements of the matrix with or without updating the flight information from the airlines. The fourth elements can include elements of the matrix excepting at least the third element. For example, if the third element is operable to replace the first element, e.g., the third element is a supersede element, then the fourth elements can include elements of the matrix excepting the third element. If the third element is operable to be combined with the first element, e.g., the third element is an AND or an OR element, then the fourth elements can include elements of the matrix excepting the first and the third elements.

The classification can be to mark the fourth elements as having flight or not having flight. For example, the fourth element is marked as having flight if there is a flight itinerary that has information in the fourth element, and information in one of a second column excepting the third element, the second column excepting the third element AND the first element, and the second column excepting the third element OR the first element. The second column can be the column containing the third element.

Thus there can be three cases for the selection of the third element, which are supersede selection (using information in the third element), AND selection (using information in the second column excepting the third element and the first element) and OR selection (using information in the second column excepting the third element or the first element).

For example, the selection of the third element can supersede the selection of the first element. Thus information in the first element can be ignored and replaced with the information in the third element. The fourth elements of the matrix, e.g., elements of the matrix except the third element, can be classified using the information in each of the second column excepting the third element and in the fourth elements. For example, if the third element selected is Southwest airline, then a fourth element of departure time between 10 and 12 can be marked as having flight if there is a non-Southwest flight departing between 10 and 12. Similarly, if the third element selected is Southwest airline, then a fourth element of departure time between 2 and 4 can be marked as not having flight if the only flight departing between 2 and 4 is Southwest flights.

The selection of the third element can be an AND selection, e.g., an AND selection between the elements in a second column except the third element and the first element. The second column can be the column containing the third element. Thus information in the elements of the second column excepting the third element can be and-combined with the information in the first element. The fourth elements of the matrix, e.g., elements of the matrix except the first and third element, can be classified using the combination of information in the elements of the second column excepting the third element and the first element and the information in the fourth elements. For example, if the first element selected is price range of 400-500, and the third element selected is Southwest airline, then a fourth element of departure time between 10 and 12 can be marked as having flight if there is a non-Southwest flight departing between 10 and 12 and costs between 400 and 500. Similarly, if the first element selected is price range of 400-500, and the third element selected is Southwest airline, then a fourth element of departure time between 2 and 4 can be marked as not having flight if there is only Southwest flights departing between 2 and 4 and costs between 400 and 500.

The selection of the third element can be an OR selection, e.g., an OR selection between the elements in a second column excepting the third element and the first element. The second column can be the column containing the third element. Thus information in the elements of the second column excepting the third element can be or-combined with the information in the first element. The fourth elements of the matrix, e.g., elements of the matrix except the first and third element, can be classified using the combination of information in the elements of the second column excepting the third element or the first element and the information in the fourth elements. For example, if the first element selected is price range of 400-500, and the third element selected is Southwest airline, then a fourth element of departure time between 10 and 12 can be marked as having flight if there is a non-Southwest flight departing between 10 and 12 and costs between 400 and 500. Similarly, if the first element selected is price range of 400-500, and the third element selected is Southwest airline, then a fourth element of departure time between 2 and 4 can be marked as not having flight if the only flights departing between 2 and 4 and costs between 400 and 500 are Southwest flights.

In some embodiments, the display of the search results can be re-arranged to show additional flights characteristics. The flight matrix can be expanded to broaden the search results, e.g., to include more information or flight itineraries. For example, a customer might specify a departure airport. The search can include nearby airports, as to provide the customer a wider selection of possible flight itineraries. The customer might specify a departure date. The search can include days before and days after the specified date, such as a few weeks, e.g., 1, 2, 3 or 4 weeks before or after, or a few months, such as 1, 2, 3 or 4 months before or after, as to provide the customer a wider selection of possible flight itineraries.

The flight matrix can be contracted to simplify the display, e.g., combining more information in elements of the flight matrix. For example, a date range of the category departure date can be 1 hour, 2 hours, 10 hours, 1 day, 2 days, or 1 week.

FIGS. 9A-9B illustrate expanded and contracted flight matrices according to some embodiments. In FIG. 9A, the flight matrix 900 can be expanded to include a category of airport 920, which can include the nearby airports corresponded to an input airport from the customer. For example, the customer can specify New York City, and the search can include the airports in and near New York City, which includes JFK, LGA and EWR. In FIG. 9B, the flight matrix 905 can be contracted so that the date range of the departure time can be 2 days, thus at least an element 925 can be 2 days. As shown, other elements of the departure date category can be 2 days, but other configurations can be used, such as different date ranges for different elements of the departure time column.

Figure 10A:
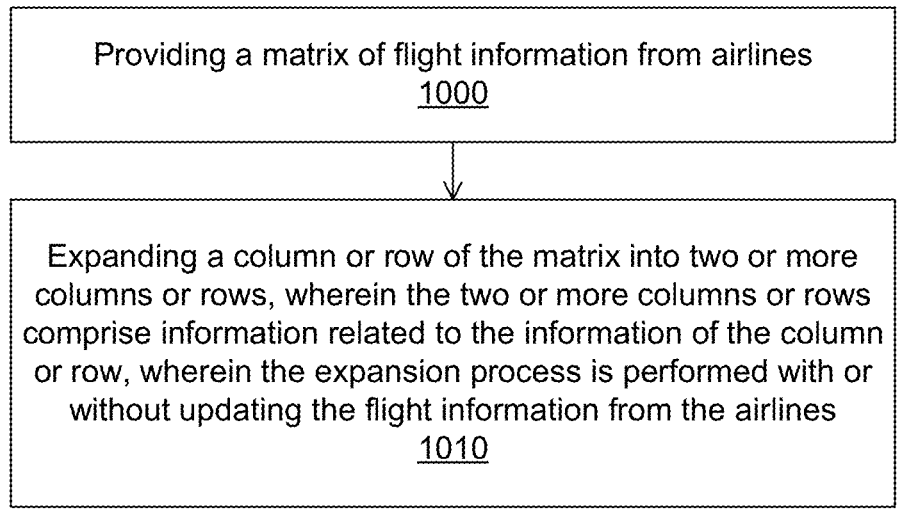
FIGS. 10A-10B illustrate flow charts for expanding and contracting flight matrices according to some embodiments.
Figure 10B:
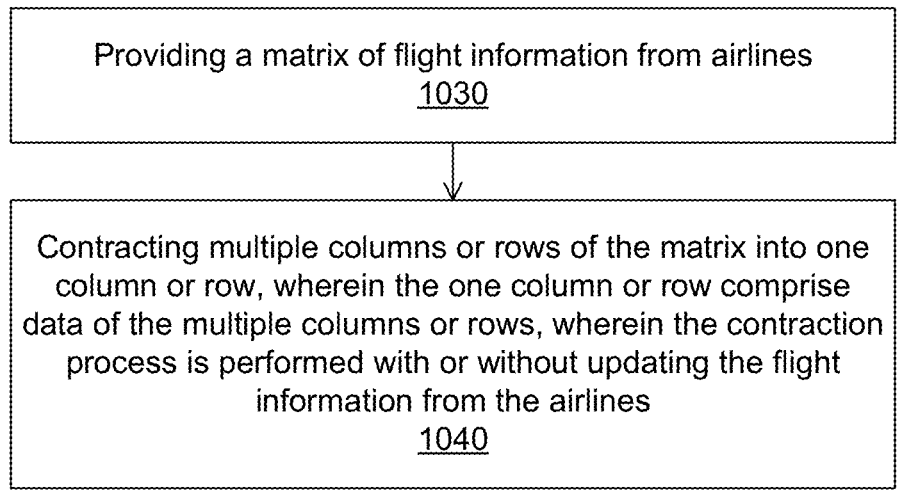

FIGS. 10A-10B illustrate flow charts for expanding and contracting flight matrices according to some embodiments. In FIG. 10A, operation 1000 provides a matrix of flight information from airlines. Operation 1010 expands a column or row of the matrix into two or more columns or rows, wherein the two or more columns or rows comprise information related to the information of the column or row, wherein the expansion process is performed with or without updating the flight information from the airlines. For example, new category can be added to existing categories, such as departure time and departure city can be added to departure, to provide nearby cities or airports. New data or data ranges can be added to rows, such as expanding an element of 8 am-10 am into two elements of Sam-9 am and 9 am-10 am.

The expansion of the flight matrix can be performed with or without updating. For example, to add new departure city, a new search can be performed, and the search results for the travel plan can be updated. To expand the data in rows, the expansion can be performed without updating the search results, since the re-arrangement of the flight matrix can be performed using the existing search results.

In FIG. 10B, operation 1030 provides a matrix of flight information from airlines. Operation 1040 contracts multiple columns or rows of the matrix into one column or row, wherein the one column or row comprise data of the multiple columns or rows, wherein the contraction process is performed with or without updating the flight information from the airlines. For example, existing categories can be consolidated into fewer categories, such as departure time and departure city can be consolidated into departure, or departure city can be omitted. Data or data ranges can be consolidated into fewer rows, such as two elements of 8 am-9 am and 9 am-10 am can be consolidated into one element of 8 am-10 am. The contraction of the flight matrix can be performed with or without updating.

In some embodiments, the display of the search results can be re-arranged to show suitable flight itineraries.

The flight matrix can show the list of available characteristics of flight itineraries, without actually showing the flight itineraries. For example, the flight matrix can show that there are flights cost between 200 and 300, and there are flights from United. However, there might not be a United flight that costs 200-300. The re-arrangement of the flight matrix can show the flight itineraries.

The flight matrix can be re-arranged, to switch between showing the list of available flight characteristics and the flight itineraries. The re-arrangement can be performed any time, for example, after a filtering process, e.g., removing elements of the flight matrix according to the customer selections. The re-arrangement of the flight matrix can be performed without updating the search results, since the re-arrangement can simply re-arrange the same data for display purposes.

The re-arrangement can include connecting lines for showing the information of individual flight itineraries. The re-arrangement can include re-arranging the flight matrix into multiple rows, with each row containing information of a flight itinerary.

FIGS. 11A-11B illustrate a re-arrangement of flight matrices according to some embodiments. Connecting lines can be added to show individual flight itineraries. The search results of a travel plan can be displayed in a flight matrix, for example, a matrix using categories in columns and data of categories in rows. For example, a flight matrix 1100 can be displayed, optionally with element 1110 (flight departing between 10 and 12) selected as a flight criterion. For the selection of departure time between 10 and 12, the elements of the matrix can be marked, such as elements 1120 marked as having flight and elements 1130 marked as not having flights. The marking of the elements can be performed after one or more selections of flight characteristics, as described above. As shown, the flight matrix 1100 lists characteristics of possible flight itineraries, such as element 1120 showing that there is at least a flight itinerary that cost between 500 and 600. Or that element 1130 shows that there is no Southwest flight for the input travel plan.

The flight matrix 1100 can be re-arranged into flight matrix 1105, which can show the flight itineraries. For example, connecting lines 1140, 1142, and 1144 in the flight matrix can be included to show the individual flight itineraries. Three flight itineraries can be shown for this flight matrix arrangement. For example, there is a flight itinerary 1144, which costs between 500 and 600, which departs between 10 and 12, arrives between 12 and 2, for 2-4 hour travel time with 0-2 layover time, and is operated by American Airlines. There are two other flight itineraries 1140 and 1142, with flight itinerary 1140 operated by a combination of United and American Airlines and flight itinerary 1142 operated by Delta, which have some similar flight characteristics such as cost and departure time, but having different travel times.

The re-arrangement of the flight matrix, e.g., toggling between listing of information (as shown in flight matrix 1100) and flight itineraries (as shown in flight matrix 1105), can be performed without updating of the search results. All data have been stored in the saved search results, so the toggling or re-arrangement of the flight matrix can be quickly completed. Thus the customer can perform selections of suitable flight itineraries without or with minimum waiting time, since the operation can be completed using saved search results.

In some embodiments, the search results can be periodically updated, for example, after every 5 minutes, 10 minutes, 15 minutes, 20 minutes, etc. The periodic update can ensure that the flight matrix contains up-to-date information, such as reflecting changes due to other customers accessing same flight database during the time the customer looks for suitable flight, especially for high demand flights. The update of flight information can be performed in a background.

FIGS. 12A-12C illustrate a re-arrangement of flight matrices according to some embodiments. The flight matrix can be re-ordered into multiple rows, with each row containing information of a flight itinerary.

FIG. 12A shows a flight matrix 1200, which can be a simple re-arrangement of the flight matrix 1100 above. The flight matrix 1200 can include multiple rows 1240 and 1242. Each row can represent a flight itinerary. For example, row 1240 can show a flight itinerary that departs at 10 am, arrives at 4 pm, with 6 hours total travel time and 2 hours layover time. The cost of the flight is 300. The flight itinerary is operated by American Airlines and United. This flight itinerary can be similar to the flight itinerary 1140, shown by connecting lines in flight matrix 1100, except with more detail information.

For example, the connecting lines 1140 connect the cost element of 300-400, to the departure time of 10-12, to the arrival time of 2-4, to the travel time of 4-6, to the layover time of 2-4, to the airline of United/American Airlines. In contrast, the flight itinerary 1240 can list the exact value, such as the cost of 300, the departure time of 10, the arrival time of 4, the travel time of 6, the layover time of 2, and the airline of American Airlines and United.

Row 1242 can show a flight itinerary that departs at 10 am, arrives at 3 pm, with 5 hours total travel time and 1 hour layover time. The cost of the flight is 400. The flight itinerary is operated by American Airlines. This flight itinerary can be similar to the flight itinerary 1142, shown by connecting lines in flight matrix 1100, except with more detail information.

FIG. 12B shows a flight matrix 1202, which can be another re-arrangement of the flight matrix 1100, and which can show more detail information. Two sub-rows 1245 and 1246 can be used to describe the flight itinerary 1240. Since the flight itinerary can have multiple flight segments, sub-rows can be used to provide detail information. For example, in sub-row 1245, a first flight segment from American Airlines can depart at 10, arrive at 12 for 2 hour travel time. After a layover time of 2 hours, sub-row 1246 show a second flight segment from United, which departs at 2, arrives at 4 for 2 hours of travel time. The total price for the two flight segments is the same, which is 300.

FIG. 12C shows a flight matrix 1204, which can be another re-arrangement of the flight matrix 1100, and which can show more detail information. Additional information can be included, such as date, airport, terminal, and seat.

In some embodiments, the different flight matrices, e.g., flight matrix 1100, 1105, 1200, 1202, and 1204 can be toggled, e.g., switching from each other, to allow the customer different views of the possible flight itineraries.

As shown, the flight itineraries are sorted based on price. The flight itineraries can be sorted based on different criterion, such as based on a customer preference.

Figure 13A:
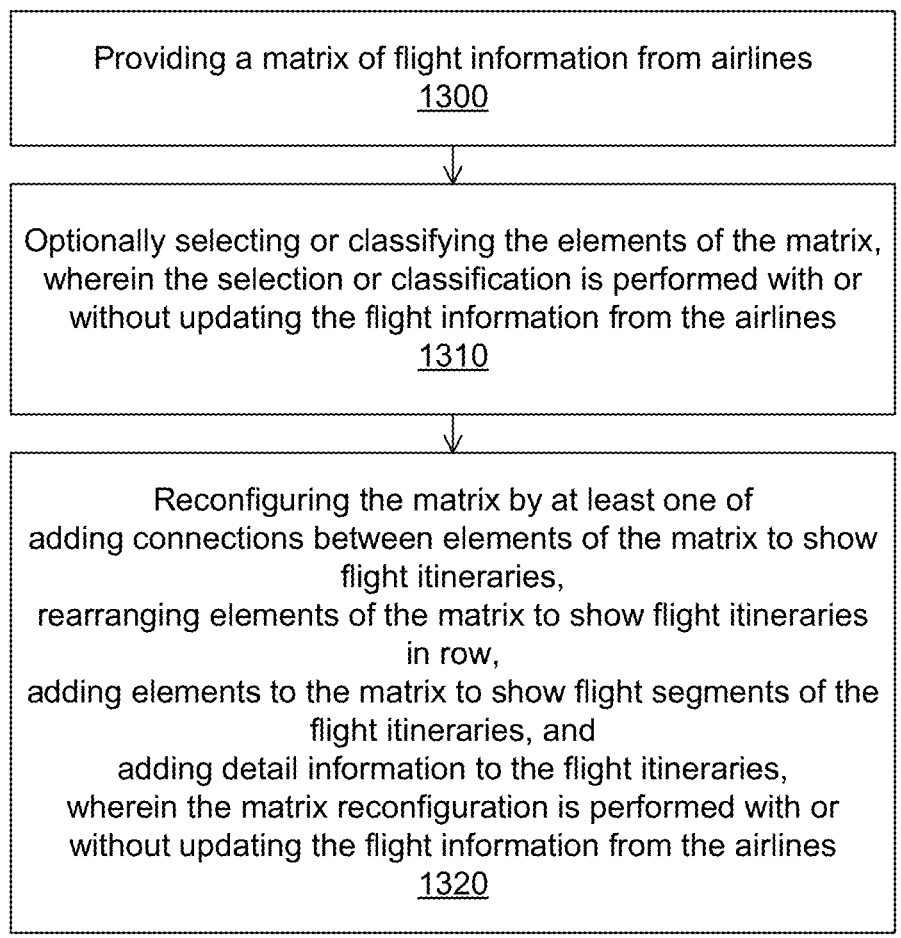
FIGS. 13A-13B illustrate flow charts for displaying flight matrices according to some embodiments.
Figure 13B:
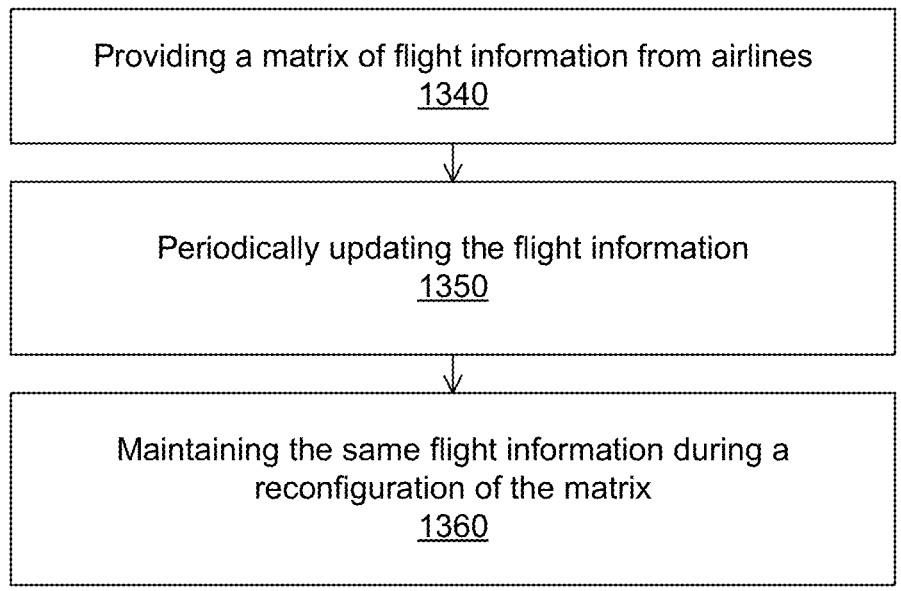

FIGS. 13A-13B illustrate flow charts for displaying flight matrices according to some embodiments. In FIG. 13A, operation 1300 provides a matrix of flight information from airlines. Operation 1310 optionally selects or classifies the elements of the matrix, wherein the selection or classification is performed with or without updating the flight information from the airlines. Operation 1320 reconfigures the matrix by at least one of adding connections between elements of the matrix to show flight itineraries, rearranging elements of the matrix to show flight itineraries in row, adding elements to the matrix to show flight segments of the flight itineraries, and adding detail information to the flight itineraries. The matrix reconfiguration can be performed with or without updating the flight information from the airlines.

FIG. 13B shows a process of maintaining a flight matrix, which can be generated from search results of a travel plan. Operation 1340 provides a matrix of flight information from airlines. Operation 1350 periodically updates the flight information, for example, by contacting the airlines or by contacting a database containing updated flight information of the airlines. Operation 1360 maintains the same flight information during a reconfiguration of the matrix.

In some embodiments, the present invention discloses methods, systems, and programs that can perform the methods, to provide a personal travel agency service, such as getting suitable flight itineraries to a customer. The programs can run on a data processing system, such as a computer or a mobile device like a cell phone. The methods can include getting a desired travel schedule from a customer, and display the most suitable flight itineraries in prominent positions for ease of selection. For example, a search on the airlines database for a travel schedule can yield hundreds of flight itineraries, with different flight characteristics. The personal travel agency service, knowing the customer preference, can sort the flight itineraries so that the first few displayed flight itineraries, are among the likely candidates for the customer.

In some embodiments, the personal travel agency service can display the search results of an inputted travel plan according to a saved customer preference, e.g., sorting the search results according to the customer preference. Thus the most suitable flight itineraries, e.g., the flight itineraries that meet the most of the customer preference, can be displayed first, together with the most concerned features showing on the screen. Other flight itineraries and/or other features can be seen by scrolling the screen.

Figure 14A:
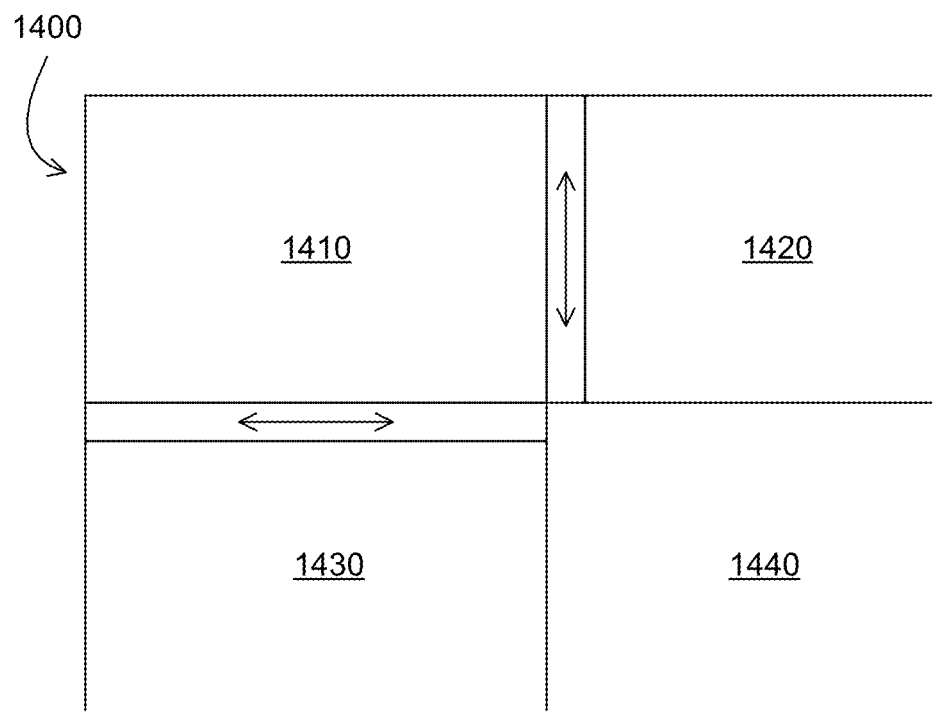
FIGS. 14A-14B illustrate flight matrices to be displayed on a screen according to some embodiments.
Figure 14B:
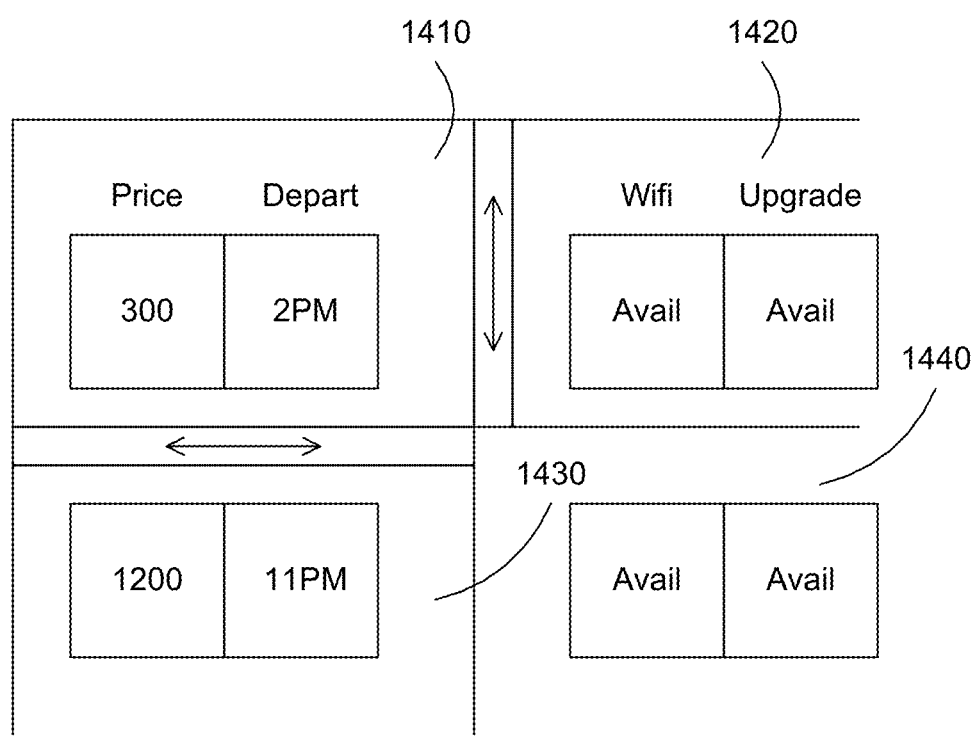

FIGS. 14A-14B illustrate flight matrices to be displayed on a screen according to some embodiments. A flight matrix 1400, which can contain the search results for a customer travel plan, can be displayed on a screen 1410. The size of the flight matrix 1400 can be larger than the size of the screen 1410, for example, there can be hundreds of flight itineraries, and a large number of flight categories. Thus only a portion of the flight matrix 1400 can be seen on the screen 1410. The rest of the flight matrix can be viewed by scrolling the display. For example, the right portion 1420 can be viewed when scrolling the screen to the right. The bottom portion 1430 can be viewed by scrolling down the screen. The right bottom portion 1440 can be viewed by scrolling down and to the right.

In some embodiments, the present invention discloses methods to display the most suitable flight itineraries in the visible screen portion 1410. The most suitable flight itineraries are based on the individual customers, e.g., different customers can have different suitable flights. In other words, a most suitable flight itinerary for a first customer is not necessarily suitable for a second customer. The suitability of the flight itineraries can be based on a customer preference, e.g., the methods can previously save a customer preference, and then use the save preference to determine the suitability of flight itineraries for the customer. In addition, the methods can include updating the customer preference, for example, based on the actions of the customer in selecting flight itineraries.

The suitable flight itineraries can be arranged so that the most suitable flight itineraries are shown first, e.g., in the visible screen 1410. The most unsuitable flight itineraries can be shown last, e.g., in the scroll-down portion 1430 of the screen. For example, if price is very important to a customer, then cheaper flights are shown first, and more expensive flights last. If the total travel time, or the layover time, e.g., the time waiting between flight segments, is important, e.g., a customer might accept up to 4 hours in layover time, then flights with less than 4 hour layover time are shown first, and flights with the most layover time are shown last.

Further the categories of the flight itineraries can be arranged so that the important features of the flight itineraries are shown on the left portion, e.g., on the visible screen 1410. The less important features can be shown on the scroll-right portion 1420. For example, the features of price, departure and arrival information, travel time and layover time, and airline names can be important, which can be shown in the visible screen 1410. The availability of amenities, such as wifi, upgradable, early boarding, lounge access, etc., can be less important, which can be viewed in the scroll-right screen 1420. Any amenity features that are considered to be important to a particular customer, such as based on a saved customer preference, can be re-arranged to be on the visible screen 1410.

In some embodiments, the arrangement of the flight matrix to show suitable flight itineraries in the visible display can be based on a customer preference, such as a customer preference that has been stored in the system.

The customer preference can be initialized by a questionnaire filled by the customer. The customer preference can be updated with the selections made by the customer on the displayed flight itineraries. For example, if the customer chooses morning flights, then morning flights can be added to the preference list, for future displays. If the customer wants to avoid red-eye flights, then the preference list can reduce the display priority of red-eye flights.

The customer preference list can be prioritized, e.g., certain preferences can be more important or have higher priority than other preferences. The priority of the preferences can be formed during the selections of the flight characteristics to be displayed, either automatic or manually chosen by the customer. For example, the to-be-avoided flight characteristics can automatically have lower priority than the to-be-selected flight characteristics. The flight characteristics that are repeatedly selected or repeatedly displayed without being changed can have higher priority. The final flight characteristics, e.g., the flight characteristics of the final flight chosen to be purchased, can have higher, or even highest priority, since it is definitely the flights that the customer wants. In some embodiments, the customer can manually choose the levels of priority for certain flight characteristics. For example, the customer can select American Airlines to be the preferred airlines, perhaps since the customer has a frequent flyer program with American Airlines.

In some embodiments, the customer preference can be updated through the customer selections on the flight matrix. For example, if the customer selects United to be a selected element, e.g., a positive selection, in the display flight matrix, then the item "United airlines" can accumulate an additional priority point. In contrast, if the customer selects American Airlines to be a non-selected element, e.g., a negative selection, in the display flight matrix, then the item "American Airlines" can have a priority point subtracted. In some embodiments, if the customer selects a final itinerary for purchase, then the features of the flight matrix shown in the visible display can each be added a priority point, implying that the display matrix represents a customer preference. The customer preference can be generated, or assisted in the generation, through artificial intelligence and machine learning.

In some embodiments, the methods can automatically or semi-automatically prioritize flight itineraries, including listing flight itineraries based on a suitability consideration. The methods can first collect flight itineraries, for example, by performing a search from airline databases, then order flight itineraries based on a customer preference, and then present the customers with a list of flight itineraries for the customer's final approval.

In some embodiments, the methods can include machine intelligence, which can contain algorithms to select flight itineraries, among the flight itineraries having the desired destination that is most suitable for the customers. The algorithm can be based on customer travel profiles, such as travel preference profiles and behavioral profiles. For example, the methods can de-prioritize flight itineraries with layover time longer than 5 hours, or travel plans with excessive fares, e.g., fares higher than certain limits.

In some embodiments, the present invention discloses programs that can perform the machine intelligence methods for selecting flight itineraries for the customers. The programs can be used in a data processing system, or can be used in a mobile system, such as a cell phone, which can communicate with airlines for generating travel plans, and which can perform the machine intelligence algorithms for choosing flight itineraries for the customers. The programs can communicate with the customers through voice and/or display. For example, a customer can dictate (or type) to the programs to find a travel plan on a certain date to a certain city. The programs can respond by display and/or speech to tell the customer the available travel options.

In some embodiments, the machine intelligence can make decision, e.g., selecting flight itineraries, based on profiles and inputs from the customer. The profiles and inputs can be collected before, during or after finding the available flight itineraries. For example, preference travel profiles from the customer can be provided to the programs at a beginning, which can allow the programs to choose appropriate flight itineraries. For example, the customer can prefer flight schedules convenience over price, and thus long lay overtime or uncomfortable flight itineraries can be removed from consideration, even though these flight itineraries might have lower fares. Different preference travel profiles can be used during the search for the travel plans, such as traveling for business (e.g., business profile) or pleasure (personal profile), with or without family members (single or family profile). In addition, inputs from the customer can be provided to the programs after getting available flight itineraries, such as choosing the best flight itineraries among the available flight itineraries, or asking the programs to widen the search.

In some embodiments, the profiles and inputs from the customers can assist the programs in selecting flight itineraries, together with improving the selection process so that ultimately, the programs can present the customer with flight itineraries that the customer would approve. The stored information, e.g., the profiles, can be used to narrow the search to appropriate flight itineraries. The selection of the customer can be used in future search, e.g., the programs can learn from the past experience, for example, by updating the profiles. For example, in the beginning, the programs can offer multiple flight itineraries, with some flight itineraries de-prioritized based on the stored information. Later on, the programs can offer only a few flight itineraries, and ultimately, the programs can book and purchase a flight itinerary for the customer. With the collected data and experience, the programs can be able to choose the flight itinerary that is most suitable for the customer, e.g., a flight itinerary that the customer would select, based on the available flight itineraries.

In some embodiments, the profiles can be generated by collecting data and information from the customer, which can be used by the programs to select flight itineraries. The information can be collected from customer inputs, e.g., in the form of a fill-in questionnaire. The information can include name, birthday, traveling preferences, membership in frequent flyer programs, and income. Other information can also be collected, since the information can be used to make decision in flight itinerary selection. The use of the information can be explicit. For example, a customer can specify that low fare is the highest priority. Thus flight itinerary selection can be simplified with fares being the top priority. The use of the information can be implicit. For example, a high income customer would be likely to select comforts over prices, and thus higher fare plan for short layover time (e.g., waiting time between segments of the travel plans) or additional legroom or better customer service can be preferred over lower fare plans.

In some embodiments, the information can be collected from public or private databases, such as credit history and professional association of the customers. The information can be collected from the customer activities, such as from correspondence of the customers, which can indicate a traveling preference of the customers. For example, the customers can send emails, discussing traveling, and indicating that early check-in or boarding can be an important consideration in air traveling. This information can be used to choose flight itineraries, with priority for airlines offering early checking or boarding.

In some embodiments, the information can be collected from past actions of the customers. For example, even though the customers specify a preference of comforts over prices, the customers still select flight itineraries having lower fare and slightly high discomforts. Thus the past actions of the customers can be a more reliable indication of the customer travel preference, for example, over the answered questionnaires.

Figure 15:
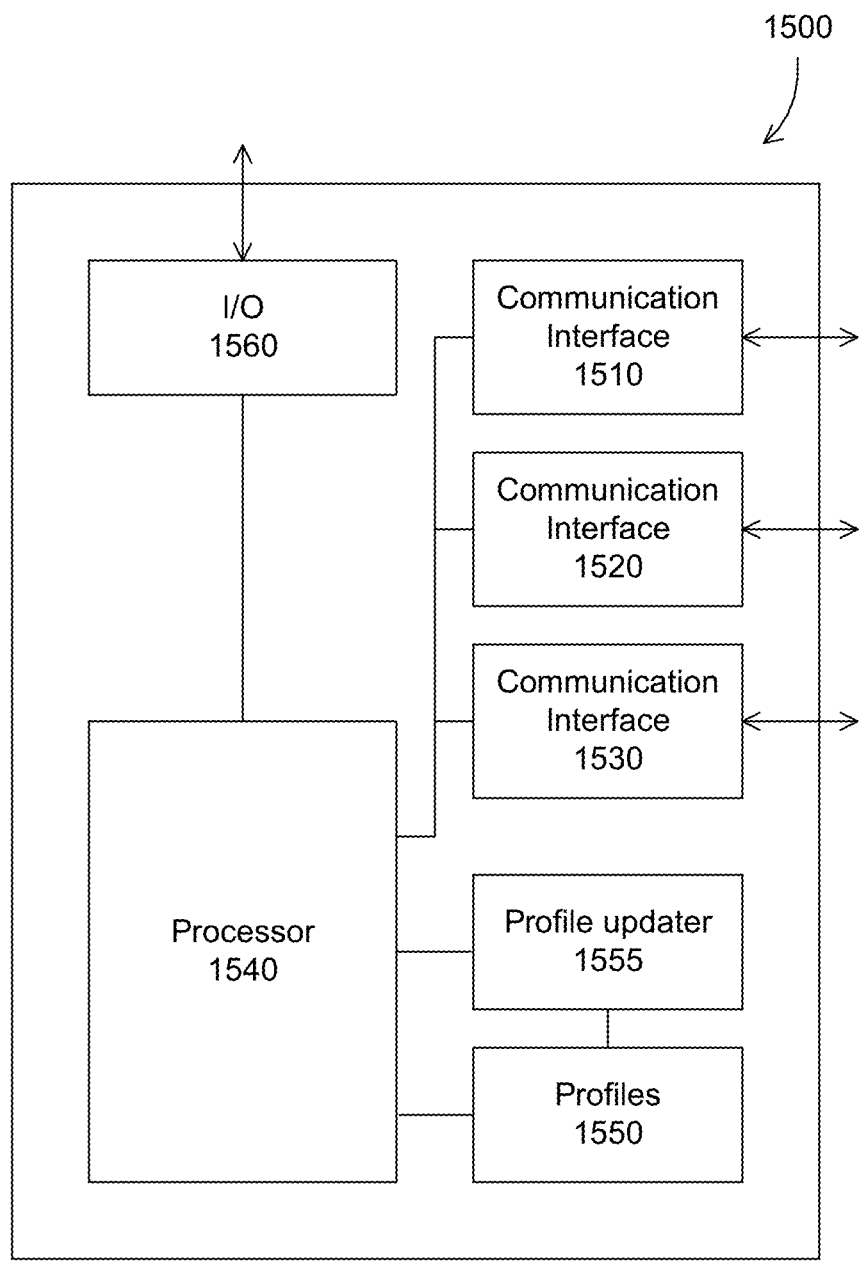
FIG. 15 illustrates a configuration for a device incorporating a personal travel agency service according to some embodiments.

FIG. 15 illustrates a configuration for a device incorporating a personal travel agency service according to some embodiments. A device 1500, such as a computer system or a cell phone, and in general, a desktop or a portable system having a computational capability, can include a processor 1540. The processor can communicate, for example, with the customer, through an IO module 1560, which can include a display, a speaker, a keyboard, and a microphone. Other components can be included in the IO module to facilitate or to improve customer communication, such as a voice amplifier for the hard-hearing or a Braille system for the blind.

The device 1500 can include communication interfaces, for example, to communicate with airlines or with airline systems for obtaining travel information. The communication interfaces can include an interface 1510 for communication with a travel distribution system, such as a travel distribution system communicating with airlines using NDC protocols. The communication interfaces can include an interface 1520 for communication with a GDS system, which can communicate with airlines participating in GDS system. The communication interfaces can include an interface 1530 for communicating with the internet, which can communicate with airlines through the airline web sites or their mobile Apps.

The device 1500 can include profile module 1550 and a profile-updating module 1555. The profile module can store profiles of the customers. For personal devices, such as a cell phone, the profile module can store the profiles of a customer, e.g., the owner of the cell phone. There can be multiple profiles for a person, such as a business profile for business traveling, a business companion profile for family member accompanying on business trip, a personal profile for personal traveling, and a family profile for family traveling for leisure.

The device can be configured to run a program that performs a method for getting a flight itinerary for the customer. For example, the device can get a proposed travel plan from the customer, such as the date and the city pair of travel. The device then can find flight itineraries from airlines, for example, by using the communication interfaces for contacting airlines using NDC protocols, airlines participating in GDS system, and airlines having web sites and mobile Apps. The device can use the stored profiles to prioritize the flight itineraries, and then present the prioritized flight itineraries to the customer. In the beginning, the device can require inputs from the customer for selecting optimal flight itineraries. The inputs can be used to update the profiles. Thus, after a certain time, the profiles will continue getting more intelligent and the flight itineraries selected by the program based on the profiles can be as good as the flight itineraries that the customer selects himself.

In some embodiments, the programs can search for flight itineraries meeting the customer specification. The programs can then collect other data, such as fare, amenity and comforts. Based on the customer profiles, the programs can choose suitable flight itineraries for the customers. The suitable flight itineraries can be presented to the customers for further selection or approval.

In some embodiments, the customer can have different profiles based on different purposes. Thus the programs can select different travel plans based on different profiles specified by the travel purposes of the customers. For example, convenience can have higher priority than fare for business traveling. Traveling with family, especially with young children can have different preferences than traveling alone. Thus the customer flight preferences can be classified into different modes, such as business mode for business traveling, personal mode for leisure traveling, and family mode for traveling with family, either for business or pleasure.

In some embodiments, the profiles can be updated, e.g., the programs can ask the customers for additional data, e.g., beyond the stored data and information that the customers have supplied, to make decision of travel plan selection. The programs can ask the customers for selecting plans, among different plans. The selection of the customers can be used to improve the programs. For example, the programs can have a machine-learning module, which can learn from past actions of the customers, such as the selection of travel plans that the programs present to the customers. The programs can provide travel plans with different characteristics, such as one having low fare/low comfort and one having high fare/high comfort. Based on the selection of the customers, a preference matrix can be established, formulating a preference relationship between price and comfort.

In some embodiments, the present invention discloses behavioral profiles for customer travels. The profiles can be dynamically developed, e.g., the profiles can be updated with the customer behavior and actions. For example, an initial profile can be provided, using inputs from the customer. The initial profiles can include information similar to that given to a human travel agent. For example, the initial profiles can include a preference of the customer regarding seat selection, e.g., aisle or window seat.

The profiles can be dynamically enhanced, for example, with data input from the client's purchase history and behavior in making choices from the travel offerings that are presented to him/her. The profiles can also be dynamically enhanced with data collected on the client from social media and the World Wide Web. The dynamic enhancement can help refine the behavioral predictability and help the programs making decisions that mirror the client's own behavior.

In some embodiments, the profiles or the preference matrix can include multiple elements, each with different important scale. For example, the profiles can include price, which can be a less important factor when travelling for business as compared to travelling for leisure. The profiles can include schedule convenience, which can be more firm for business travel versus more flexibility for leisure travel. The schedule convenience can include departure time, arrival time, number of flight segments, e.g., number of stops, and layover time between flight segments. The profiles can include other elements, such as maximum number of stops, connections, or flight segments, optimal layover time between flight segments, free checked bags, priority boarding, complimentary upgrades, system wide upgrades, better customer service/dedicated phone lines, discounted/free lounge access, mileage earning bonuses, access to preferred seating ahead of time, waived award fees for tickets, free same-day changes, free or discount on ticket change fees, price hold on booking for a period of time, free/discounted refund or exchange fees, free wifi, free meals, extra leg room, free entertainment (movies, games etc.).

FIG. 16 illustrates a configuration of a travel profile according to some embodiments. The profile can have a number of elements. Each element of the profiles can have a scaling factor, which indicates the importance of the element for a particular trip. For example, a customer can place high importance to price, thus the price element can have a scaling factor of, for example, 7 out of 10. The customer can travel alone with minimum baggage, thus can place low importance to pre-boarding access or priority boarding, thus the pre-boarding element can have scaling factor of, for example, 2 out of 10. The scaling factor can be a function, instead of a number. For example, a layover time of 2 hours can be considered optimal, and can have a scaling factor of 8. A layover time of 6 or more hours can be considered undesirable, and thus can have a scaling factor of 1. The profiles can be used to rank the different available travel plans, and the travel plans having high ranks can be selected for the customer review, or for purchasing the flight. The scaling factor can be a function of airlines, e.g., the customer can have different preferences for different airlines. For example, a customer may not want American Airlines to offer a lounge at the airport because the customer already has a yearly lounge pass with American Airlines. A customer may or may not want United Airlines to offer a lounge at the airport because the customer already has a yearly lounge pass with American Airlines. For example, if the United Airlines lounge is closer to a departing gate as compared to the American Airlines lounge, the customer might be interested in obtaining the United Airlines lounge pass.

In some embodiments, there can be different preference profiles for a customer, e.g., a customer can have multiple profiles, depending on different travel purposes. For example, a customer can have a preference profile for business travel, another preference profile for personal travel, and another preference profile for family companion travel. There can be different scaling factors for same elements in different profiles. For example, on-time performance of the flight schedule is important in business travel, while price is important in personal travel.

After getting flight itineraries from each airline, the programs can match the flight itineraries against the flight request. The programs can prioritize the flight itineraries based on the profiles that the programs have built on the client's behavior. The list of flight itineraries can then be presented to the customer, in order of priority.

In some embodiments, the programs can have authority to purchase airfares. For example, the stored information can include credit card information, so that when a travel plan is approved by the customer, the programs can purchase the flight. For multiple selections, the programs can require inputs from the customers before purchasing the flight.

In some embodiments, the programs can include machine intelligence, so that after receiving instruction from the customers, the programs can search for flight information, and based on stored data and past learning experience with the customers, the programs can select a flight itinerary that is most suitable for the customers. The programs then can purchase the flight, and inform the customers of the flight schedule.

FIGS. 17A-17C illustrate flow charts for prioritizing flight itineraries according to some embodiments. In FIG. 17A, operation 1700 displays search results of a travel plan so that flight itineraries that a customer is likely to select for purchase are listed first, wherein the order of the flight itineraries is based on a saved customer preference.

In FIG. 17B, operation 1720 displays search results of a travel plan so that flight itineraries are ordered based on a saved customer preference, wherein the flight itineraries that the customer prefers are listed first.

The search results can be displayed as a flight matrix, with the flight categories in one dimension, and the data of the categories in another dimension. The flight categories and the data can be listed based on a customer preference. The listing can be so that the preferred categories and data are listed on the left top portion of the flight matrix. For example, the flight matrix can be displayed on a screen, with a visible portion showing on the screen, and the hidden portions accessible by scrolling the screen, either to the right or down.

In some embodiments, a customer preference can be used to prioritize or to order the search results of the travel plan, e.g., the flight itineraries that the search provides. A goal of the customer preference is to provide a flight matrix that shows the suitable flight itineraries in the display, e.g., the flight matrix might be larger than the display, and thus the flight matrix can be ordered or prioritized so that the suitable flight itineraries can be shown in the visible portion of the display.

The customer preference can be based on common sense. For example, low cost airfares, departure and arrival time during business hours, low travel time or low layover time, and non-stop flights are typically preferred, e.g., having higher priority in the customer preference list. Other preferences can be dependent on the customers. For example, a customer preference database can be established, which specifies the priority, e.g., the preferences, of the categories of the flight matrix, e.g., the features of the flight itineraries. Categories having higher priority can be listed first, e.g., on top and on the left in the display portion of the screen. The customer preference database can first be initialized, for example, through common sense preferences and through questionnaires. The customer preference database can be updated, for example, through the customer actions, such as through the selections of the customer, acting on the flight matrix. For example, if the customer selects "United" in the flight matrix as a selected feature of the flight itineraries, then the data "United" of the category "airline" can have higher preference than other data, e.g., other airlines. The translation of the customer actions into customer preferences can be accumulated, for example, the preference can increase by an amount, such as by one point, when the customer selects the corresponding feature on the flight matrix. The final selection, e.g., selection of flight itineraries for purchase, can have higher weight than viewing selections, e.g., selections for viewing on the flight matrix.

In some embodiments, the customer preference can override the common sense preference.

In FIG. 17C, operation 1740 receives a search input for a travel plan. Operation 1750 displays search results in a matrix format, wherein a first dimension comprises different categories of flight itineraries resulted from the search, wherein a second dimension comprises different data for the categories, wherein the categories and data are arranged according to a preference of a customer. Operation 1760 updates the preference based on at least one of a selection and a final purchase of the customer. Other characteristics of the selection can be used to update the preferences, such as a delay time between the selections. For example, a quick change of selections can indicate that there can be errors in selecting previous selections, and thus should not be used in the preference updating.

Figure 18:
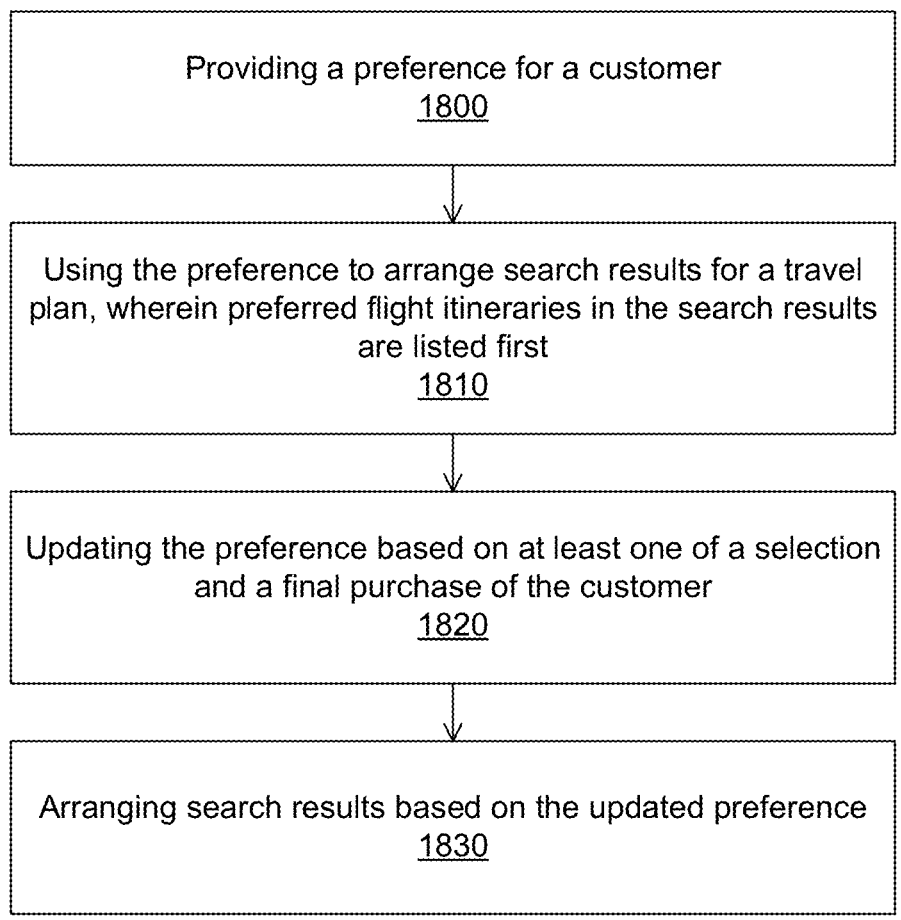
FIG. 18 illustrates a flow chart for using a customer preference list according to some embodiments.

FIG. 18 illustrates a flow chart for using a customer preference list according to some embodiments. Operation 1800 provides a preference for a customer. The preference can be an initial preference, which can be a blank preference, or filled with answers from a questionnaire or other information on the customer. The preference can be an updated preference.

Operation 1810 uses the preference to arrange search results for a travel plan, wherein preferred flight itineraries in the search results are listed first. For example, listing first can include listing the flight itineraries on a top portion of the matrix, listing the flight itineraries on a left side of the matrix, or listing the flight itineraries within a display portion.

Operation 1820 updates the preference based on at least one of a selection and a final purchase of the customer. Operation 1830 arranges search results based on the updated preference. For example, after a selection from the customer, in which the customer selects preferred aspects of flights on a flight matrix, or in which the customer selects final flight itinerary for purchase, the flight matrix can be reconfigured, and the customer preference updated.

In some embodiments, the present invention discloses methods to form a travel preference profile for a customer. The travel preference profile can be used for prioritizing the searched flight itineraries, and for selecting suitable flight itineraries, e.g., flight itineraries that meet the customer desires and expectation. The methods can include obtaining actions and characteristics of the actions of the customer when the customer selects flight itineraries, and then associating the actions and characteristics of the actions with preferences of the customer.

In general, a search for a travel flight can generate a large number of flight itineraries, e.g., typically larger than a comfortable number that the customer can browse through. For example, with less than about 5 flight itineraries, the customer can view through the selections and select the most suitable. However, with hundred of flight itineraries, a customer would not likely to have the time or patient to view the possible flight itineraries.

The travel preference profile can help prioritizing the flight itineraries, removing the flight itineraries that the customer would not consider, and de-prioritizing the flight itineraries that the customer would not likely to consider. In the beginning, actions of the customer can assist in improving the travel preference profile, for example, during the selections of suitable flight itineraries. The travel preference profile can gradually become mature, and the number of flight itineraries presented to the customer can be less. The travel preference profile can be considered to be reasonably mature when a small number of flight itineraries is displayed, such as less than 10, less than 6, or less than 6, for an inquiry of the customer. The travel preference profile can be considered to be fully mature when only one or two flight itineraries are displayed. In some embodiments, the mature travel preference profile can be configured so that there is only one flight itinerary, and the flight itinerary can be booked, all without the customer inputs. Thus having a mature travel preference profile, all the customer need to do is to input the departure location, the arrival location, and the date of departure. The system can book the most suitable flight itinerary, and can enter the flight schedule to the customer calendar.

In some embodiments, an initial profile can be formed, for example, by collecting data and information from the customer, such as by asking the customer to fill in a questionnaire. The questionnaire can be directly related to the travel preferences. For example, the customer can specify that low fare is highly desirable, which can translate to a preference of low fares.

The questionnaire can be indirectly related to the travel preferences. For example, the customer can specify memberships in frequent flyer programs. This information can imply that, all other characteristics being similar, the airlines with the frequent flyer programs should be of higher preference. If there are more than one frequent flyer program, then the program with the most mileages in it can be more preferred.

Data for the initial profile can be collected from public or private databases, such as credit history, professional association, or correspondence of the customers. For example, the income level of a customer can be determined by the customer answering the questionnaire, or by knowing the profession of the customer through a public database. Thus a high income customer can imply that comforts, such as not excessive layover times between flight segments, additional legroom, or better customer service, can be more preferred than low prices.

In some embodiments, the preferences in the travel preference profile can be relative or conditional, e.g., not always absolute. For example, a preference of low fares can be rated or having a scale factor, e.g., from 0 to 10 with 0 being no preference at all and 10 being an absolute preference. A zero preference of low fares means that money is not a concern in planning the travel itinerary. An a ten preference of low fares means that the customer would do anything in order to have the lowest fare possible. In this case, the travel fare is the first choice, and only different flight itineraries with a same lowest fare are being considered.

In general, most customers have a preference between these two extremes. When a customer specify a preference of low fares, it typically means a relative preference, e.g., a low fare is preferred if the flight itinerary is not too uncomfortable or too inconvenient. Thus the customer can specify a preference level for low fares, but the specified level can be vague and not accurate, since there can be many factors of comfort and convenience that can affect the low fare decision.

In some embodiments, the preference level can be determined from past actions of the customer, e.g., the actions of the customer in selecting flight itineraries in the past, since the actions of the customer present a clear indication of the meaning of the preference, e.g., the importance of the preference with respect to other aspects of travel. For example, even though the customer might indicate a preference for low fares, the customer might still select a flight itinerary with higher fares. The selected flight itinerary can show the level of the low fare preference, such as selecting a higher fare flight since the low fare flight contains a long layover time between the flight segments. Thus the actions of the customer can be a more reliable indication of the customer travel preferences.

In some embodiments, the display of the searched flight itineraries can be arranged according to the travel preference profile of the customer. For example, the searched flight itineraries can be shown in a flight matrix, with one dimension showing the categories of the flights, such as departure time, arrival time, number of stops (e.g., flight segments), layover times, meal, legroom, wifi, etc., and one dimension showing the ranges of the categories. The categories can be arranged so that the displayed flight matrix contains the categories with high preferences, with other categories either hidden or requiring scrolling.

In some embodiments, the flight itineraries are constantly updated. The updating can be performed in a background, thus it can appear to the customers that the travel search engine is instantaneous. Instead of updating the search right after the customer input, which will make the customer waiting, the background updating process can performed the flight search update before the customer input, for example, by either making an prediction search, or by making a broader search.

In some embodiments, the travel preference profile of the customer can be updated through actions of the customer during searching and booking for flights. The actions and characteristics of the actions can be associated with the preferences of the customer, and the preference profile can be updated. As mentioned above, the customer actions in selecting a flight can be a clear indication of the customer preferences, and can be a much better indication than any answers in a preference survey. In some embodiments, the characteristics of the actions can be associated with the preferences by linking the action characteristics with the preferences in a list of preferences in the travel preference profile.

The actions and characteristics of the actions can indicate a thinking of the customer, e.g., a desire of a preference of the customer, with regard to the travel. For example, if the customer selects a particular airline, this can indicate a strong preference of the customer toward the selected airline. If the customer selects short layover times between flight segments or stops, this can indicate a preference of comfort and convenience, e.g., over low fares.

The customer selections can be related to different aspects of the flights, such as early boarding option, wifi, better meal services, safety record of the airline, on time performance of the airline. The selections can indicate a preference of the customer with respect to the airline service. The actions of the customer can also indicate the level of the preference, for example, by the additional fare that the customer is willing to pay for such services.

The customer can browse for flights, e.g., searching but not booking or buying. The preferences associated with the browsing actions can have a lower weight in the travel preference profile, such as comparing to actions resulted in flight booking.

In some embodiments, the characteristics of the actions can include a delay time between two consecutive actions. For example, if there is a very short time between two actions, with the second action supersedes the first action, then there could be an error in the selection process, and any preference associated with the first action might not be valid. If there is a long time delay before a second selection, then the customer might be hesitate, e.g., not sure about the second selection, and thus the second selection can carry less weight as compared to other selections.

In some embodiments, the actions can include inputting a departure location, an arrival location, and a date or a date range of departure. The search can be a specific search, e.g., when the customer has a specific travel requirement, and thus the customer can specify a departure airport, an arrival airport, and a date of departure. The search can be a fuzzy search, e.g., when the customer has no specific travel requirements, and thus the customer can specify departure or arrival locations, such as a city or a broad area that encompasses multiple airports. The customer can provide a range of date, e.g., there is no specific travel date, and the customer might want to browse through the possible and available flight itineraries. The inputs can be configured to be used for searching for flight itineraries.

The searched flights can be configured to be displayed in a flight matrix format, showing categories of flights and ranges of categories. For example, the flight matrix can include a 2D matrix with one dimension being the categories of flights and one dimension being the ranges of the categories. The categories of flights can include aspects and information about the flights, such as departure location, arrival location, departure time, arrival time, number of stops, layover time between stops, airline information such as the one airline flying the route, or multiple partnered airlines codeshared the route, meal information such as kosher meals, or vegan meals, entertainment information such as overhead display or on the seat display, flight information such as legroom, or availability of early boarding. The ranges of categories can include different ranges or levels of the categories. For example, the category of departure location can have different airport locations, the category of departure time can have different ranges of time, the category of display can have elements of overhead or on the seat, the category of wifi can include the cost of wifi, etc. The category of airlines can include a single airline if all flight segments of the flight are operated by the same airline. The category of airlines can include multiple airlines if different airlines operate different flight segments of the flight.

The flight matrix can be displayed in a tile and bucket format, with tiles containing the categories of the flights, and the buckets, being different values or ranges of the tiles, containing the ranges of the categories, similar to the 2D matrix.

In some embodiments, only a portion of the searched flights is shown, e.g., only a number of categories for the flights are shown. Other categories can be hidden in a non display portion of the flight matrix. The displayed categories or the ranges of categories of the portion of the flight matrix can be determined based on the travel preference profile.

In some embodiments, display of the searched flights can be shown with the categories of flights rearranged, for example, so that the categories corresponded to preferences of the customer are visibly shown, while other categories can be hidden or can require scrolling. The rearrangement of the categories can be performed to correspond to a change in a preference of the customer. For example, the customer can look for early boarding, which might be hidden or in a scrollable screen. The customer then selects the early boarding feature, which can be stored in the preference profile. The category of early boarding can then be moved to the visible screen, e.g., its preference is elevated since the customer considers that this feature is preferred.

The flight matrix format can be advantageous over the listing format in which individual flight itineraries are shown one after the other from the departure location to the arrival location at the date of date range of departure. For example, the flight matrix can be configured so that all searched flights can be shown in one screen, with different flight categories and characteristics of the categories. With the travel preference profile, the displayed flight matrix can be even reduced since the flight matrix only shows the categories that the customer is interested in. In contrast, the listing format can include multiple pages in order to show the search flights, which can be hundreds of flights. Further, it would be tedious and time consuming to look for a flight with a particular feature, such as arrival at a certain period of time. Since the listing format is ordered by prices or by some popular categories, looking for some special features in the listing format can be very difficult.

In some embodiments, after the customer has selected features of the flights, e.g., narrowing the searched flights, the flights can be changed from the flight matrix format to a flight itinerary format. The flight itinerary format can be better suited for a small number of flights, such as less than 20 or less than 10 flights, which can be fitted to one or two screens. The switching between the two formats can be manual, e.g., determined by the customer. The switching between the two formats can be automatic, e.g., the flight format is changed when the number of searched flights is less than a manageable number, such as less than 20 or less than 10.

In some embodiments, the travel preference profile of the customer can be formed or updated based on the actions or the characteristics of the actions of the customer. A flight matrix can be shown for the searched flights, arranged in categories and ranges of categories. A customer can select an element of the matrix, such as a particular airline in the categories of airline. The selection can be positive, e.g., the selection is a preferred selection. In the above example, if the selection of the airline is marked positive, then the selected airline is a preferred airline, e.g., only flights operated by the selected airline (or flights operated by the airline's partners) are to be considered. For the positive selection, the preference profile can be updated to reflect an increase in a preference of the customer corresponded to the selection. In the above example, the selected airline can be marked as a preferred airline, and thus can take precedence over other airlines. Depending on the relative preferences, of the selected airline and of other preferences, the selected airline can be selected only if other features are similar (low relative preference of the selected airline), or even if the flights operated by the airline can have undesired features such as higher fares or less convenient timing (high relative preference of the selected airline).

The selection can be negative, e.g., the subject of the selection is not desirable. In the above example, if the selection of the airline is marked negative, then the selected airline is not a preferred airline or even a black-list airline, e.g., flights operated by the selected airline (or flights operated by the airline's partners) are not to be considered. For the negative selection, the preference profile can be updated to reflect a decrease in a preference of the customer corresponded to the selection. In the above example, the selected airline can be marked as a non-preferred airline, and thus can be least considered. Depending on the relative non-preferences, the selected airline can be selected only if flights operated by other airlines are so undesirable (high relative non-preference), or if the flights operated by the airline can have desired features that override the non-preference, such as extremely low fare or free first class upgrade (low relative non-preference).

In some embodiments, the selections of the elements can include a logical combination, such as a replacement operation, an AND operation, or an OR operation. The combination can include positive and negative characteristics, such as an AND of two positive selections, an AND of two negative selections, or an AND of a positive selection and a negative selection.

The selection of the combinations can also be recorded in the preference profile, corresponded to the appropriate preferences. For example, a selection of a replacement operation can be associated with an increase in a preference of the customer corresponded to the replacing element and a decrease in a preference of the customer corresponded to the replaced element. Since the replaced element has been previously selected, e.g., corresponded to an increase in preference, the replacement operation can decrease the preference of the replaced element, thus can neutralize the preference of the replaced element.

A selection of an AND operation can be associated with an increase in the preferences corresponded to the two or more elements. For example, if the customer selects a daytime arrival, in combination with flights operated by United airlines, both preferences can have a high mark, e.g., increasing in preference levels, reflecting the desire of the customer in choosing flights.

A selection of an OR operation can be associated with an increase in the preferences corresponded to the two or more elements, or en equalizing of two preferences. For example, if the customer selects flights operated by Delta airlines, in combination with flights operated by United airlines, both preferences can have a high mark, e.g., increasing in preference levels, reflecting the desire of the customer in choosing flights. Alternatively, the selection of both airlines can reflect an equal in preferences with regard to these airlines.

The designation of AND or OR operation can be explicit, e.g., there is indication that the combination is to be an AND or an OR operation. The designation can be implied, e.g., the combination can be determined from the context of the selections. For example, if the customer selects a daytime arrival in combination with flights operated by United airlines, the combination can be considered as an AND operation, e.g., daytime arrival flights operated by United airlines. If the customer selects flights operated by Delta airlines and flights operated by United airlines, the combination can be considered as an OR operation, e.g., flights operated either by United airlines or by Delta airlines.

In some embodiments, the actions can include selecting a flight itinerary, for example, for booking or for simulating flight selections to form or to update the travel preference profile. The selection of a flight itinerary can show that the features of the chosen flight itinerary can be preferred features, and thus the preferences corresponded to the selected flight itinerary can be further increased.

In some embodiments, the present invention discloses methods to form a travel preference profile by simulated flight booking. A customer can browse through the flight itineraries, with all actions similar to a real flight booking. The actions and characteristics of the actions of the customer can be converted to preferences, and the travel preference profile of the customer can be updated. With the simulated flight booking actions, the customer preference profile can be much improved, e.g., there are much more data, in the customer actions, to be comfortably provide a preference profile that reflects the customer desire.

In some embodiments, the present invention discloses methods to form a travel preference profile for a customer. The methods can include receiving inputs from the customer to search for flight itineraries. The inputs can include a departure location, an arrival location, and a date or a range of date of departure. The result of the search, e.g., the flight itineraries that meet the customer inputs, can be displayed in a flight matrix, showing categories of the flight itineraries and the ranges of the categories.

The matrix can be displayed based on a travel preference profile of the customer, e.g., only the categories of the flight itineraries with the highest preference levels in the travel preference profile are shown, with an optional expansion of the matrix (e.g., showing the categories with lower levels of preferences), and options for expansion or reductions of the categories or the ranges of categories.

Based on the selections, e.g., the actions of the customer in selecting the most suitable flight itinerary, such as the flight itinerary that the customer can book and purchase, the travel preference profile of the customer can be updated. As discussed above there can be an association of the selections of elements of the flight matrix with the preferences of customer.

In some embodiments, the present invention discloses methods to form a travel preference profile for a customer. The methods can include receiving inputs from the customer to search for flight itineraries. The inputs can include a departure location, an arrival location, and a date or a range of date of departure. The result of the search, e.g., the flight itineraries that meet the customer inputs, can be prioritized based on the travel preference profile, with only a small number of flight itineraries displayed to the customer.

The small number of the flight itineraries can be less than 20, less than 10, or less than 5, or even only one flight itinerary.

In some embodiments, there can be only one flight itinerary shown, e.g., the searched flights are prioritized based on the travel preference profile, with one flight itinerary meeting the travel preference profile. The methods can include booking the displayed flight itinerary.

In some embodiments, provided is a machine readable storage, having stored there on a computer program having a plurality of code sections for causing a machine to perform the various steps and/or implement the components and/or structures disclosed herein. In some embodiments, the present invention may also be embodied in a machine or computer readable format, e.g., an appropriately programmed computer, a software program written in any of a variety of programming languages. The software program would be written to carry out various functional operations of the present invention. Moreover, a machine or computer readable format of the present invention may be embodied in a variety of program storage devices, such as a diskette, a hard disk, a CD, a DVD, a nonvolatile electronic memory, or the like. The software program may be run on a variety of devices, e.g. a processor.

In some embodiments, the methods can be realized in hardware, software, or a combination of hardware and software. The methods can be realized in a centralized fashion in a data processing system, such as a computer system or in a distributed fashion where different elements are spread across several interconnected computer systems. Any kind of computer system or other apparatus adapted for carrying out the methods described herein can be used. A typical combination of hardware and software can be a general-purpose computer system with a computer program that can control the computer system so that the computer system can perform the methods. The methods also can be embedded in a computer program product, which includes the features allowing the implementation of the methods, and which when loaded in a computer system, can perform the methods.

The terms "computer program", "software", "application", variants and/or combinations thereof, in the context of the present specification, mean any expression, in any language, code or notation, of a set of instructions intended to cause a system having an information processing capability to perform a particular function either directly. The functions can include a conversion to another language, code or notation, or a reproduction in a different material form. For example, a computer program can include a subroutine, a function, a procedure, an object method, an object implementation, an executable application, an applet, a servlet, a source code, an object code, a shared library/dynamic load library and/or other sequence of instructions designed for execution on a data processing system, such as a computer.

In some embodiments, the methods can be implemented using a data processing system, such as a general purpose computer system. A general purpose computer system can include a graphical display monitor with a graphics screen for the display of graphical and textual information, a keyboard for textual entry of information, a mouse for the entry of graphical data, and a computer processor. In some embodiments, the computer processor can contain program code to implement the methods. Other devices, such as a light pen (not shown), can be substituted for the mouse. This general purpose computer may be one of the many types well known in the art, such as a mainframe computer, a minicomputer, a workstation, or a personal computer.

Figure 19:
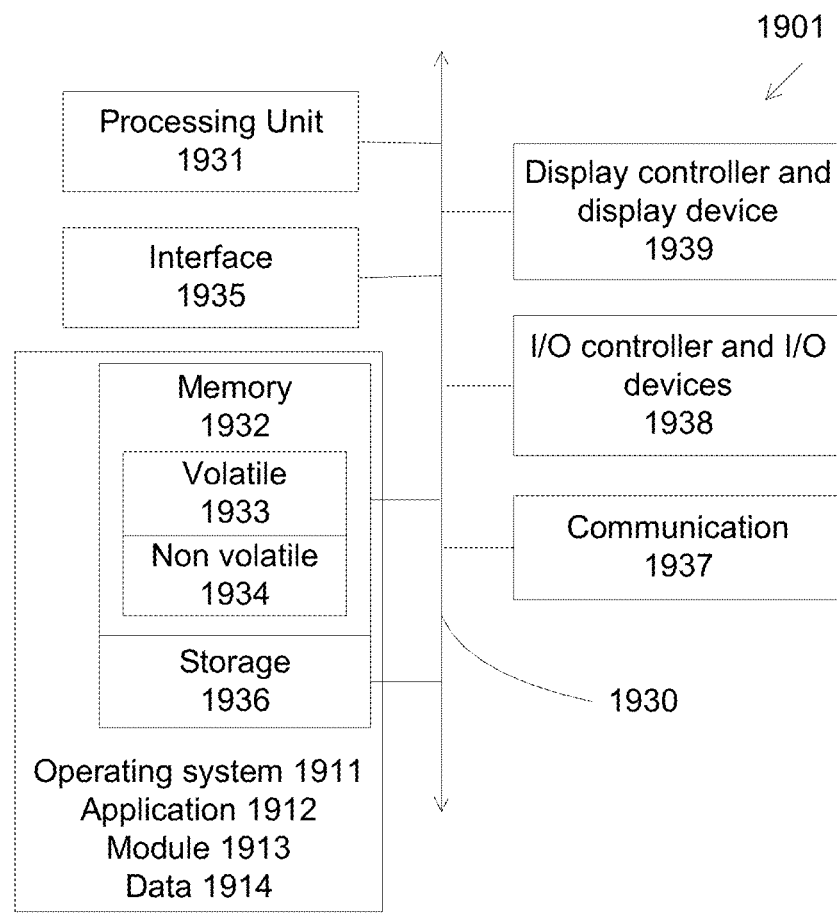
FIG. 19 illustrates a computing environment according to some embodiments.

FIG. 19 illustrates a computing environment according to some embodiments. An exemplary environment for implementing various aspects of the invention includes a computer 1901, comprising a processing unit 1931, a system memory 1932, and a system bus 1930. The processing unit 1931 can be any of various available processors, such as single microprocessor, dual microprocessors or other multiprocessor architectures. The system bus 1930 can be any type of bus structures or architectures. The system memory 1932 can include volatile memory 1933 and nonvolatile memory 1934.

Computer 1901 also includes storage media 1936, including removable storage media or nonremovable storage media, and volatile or nonvolatile disk storage. A removable or non-removable interface 1935 can be used to facilitate connection. These storage devices can be considered as part of the I/O device 1938 or at least they can be connected via the bus 1930. Storage devices that are "on board" generally include EEPROM used to store the BIOS.

The computer system 1901 further can include software to operate in the environment, such as an operating system

1911, system applications 1912, program modules 1913 and program data 1914, which are stored either in system memory 1932 or on disk storage 1936. Various operating systems or combinations of operating systems can be used.

Input devices can be used to enter commands or data, and can include a pointing device such as a mouse, stylus, touch pad, and other devices such as keyboard, microphone, connected through interface ports 1938. Interface ports 1938 can include connection ports, such as serial ports, parallel ports, or universal serial buses (USB). The interface ports 1938 can also accommodate output devices. For example, a USB port may be used to provide input to computer 1901 and to output information from computer 1901 to an output device. Output adapter 1939, such as video or sound cards, is provided to connect to some output devices such as monitors, speakers, and printers.

Computer 1901 can operate in a networked environment with remote computers. The remote computers, including a memory storage device, can be a data processing system, such as a personal computer, or a workstation, and typically includes many or all of the elements described relative to computer 1901. Remote computers can be connected to computer 1901 through a network interface 1935 and communication connection 1937, with wire or wireless connections. Network interface 1935 can be communication networks such as local-area networks (LAN), wide area networks (WAN) or wireless connection networks.

Figure 20:
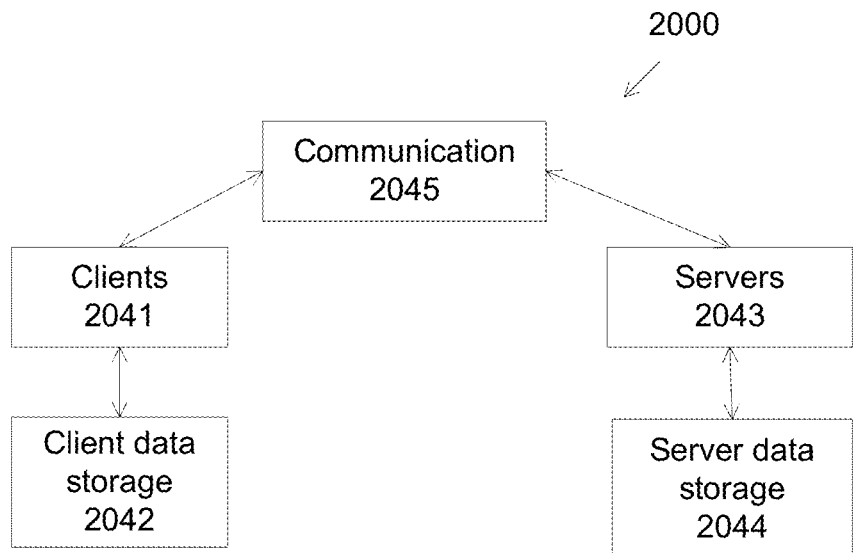
FIG. 20 is a schematic block diagram of a sample computing environment with which the present invention can interact.

FIG. 20 is a schematic block diagram of a sample computing environment with which the present invention can interact. The system 2000 includes a plurality of client systems 2041. The system 2000 also includes a plurality of servers 2043. The servers 2043 can be used to employ the present invention. The system 2000 includes a communication network 2045 to facilitate communications between the clients 2041 and the servers 2043. Client data storage 2042, connected to client system 2041, can store information locally. Similarly, the server 2043 can include server data storages 2044.

In some embodiments, the present invention discloses a travel preference profile for a customer, and methods to form and/or update the travel preference profile. A method to form a travel preference profile for a customer can include obtaining characteristics of actions of the customer in selecting flight itineraries; associating the characteristics with preferences of the customer; and forming or updating the travel preference profile of the customer based on the preferences, with the profile configured for prioritizing the flight itineraries.

The actions of the customer in selecting flight itineraries can include inputting a departure location, an arrival location, and a date or a date range of departure, wherein the inputs are configured to be used for searching for flight itineraries, wherein the searched flights are configured to be displayed in a flight matrix format, wherein the flight matrix format is configured to show categories of flights and ranges of categories; selecting one or more elements of the flight matrix, wherein the selection of each of the one or more elements comprise a positive operation or a negative operation, wherein the selection of a combination of two or more of the one or more elements comprise at least one of a replacement operation, an AND operation, and an OR operation, wherein after the selections, elements of the matrix are configured to show whether or not there are flights meeting the characteristics of the selected elements; changing the flight matrix format to a flight itinerary format, wherein the flight itinerary format is configured to show information of flights from the departure location to the arrival location at the date of date range of departure; selecting a flight itinerary; and optionally re-arranging categories of flights, wherein a selection of categories re-arrangement is configured to be associated with a change in a preference of the customer corresponded to the re-arranged categories.

In some embodiments, the characteristics of the actions can include a delay time between two consecutive actions, can include booking actions, browsing actions, or aspects of travels.

In some embodiments, associating action characteristics with preferences can include linking the action characteristics with the preferences in a list of preferences in the travel preference profile.

In some embodiments, the flight matrix can include a 2D matrix with one dimension being the categories of flights and one dimension being the ranges of the categories, and the flight itinerary comprises a list of individual flights. A portion of the flight matrix can include shown, wherein the categories or the ranges of categories of the portion of the flight matrix are determined based on the travel preference profile. A selection of an element for a positive operation can be configured to be associated with an increase in a corresponding preference of the customer, and a selection of an element for a negative operation can be configured to be associated with a decrease in a corresponding preference of the customer.

A selection of a combination of the two or more elements for a replacement operation can be configured to be associated with an increase in a preference of the customer corresponded to the replacing element and a decrease in a preference of the customer corresponded to the replaced element. A selection of a combination of the two or more elements for an AND operation can be configured to be associated with an increase in a preference of the customer corresponded to the two or more elements. A selection of a combination of the two or more elements for an OR operation can be configured to be associated with an equal increase in a preference of the customer corresponded to the two or more elements. A selection of a flight itinerary for booking can be configured to be associated with an increase in elements involved in the booked flight itinerary.

In some embodiments, the present invention discloses a method for obtaining suitable flight itineraries from searched flight itineraries, from a prioritization scheme based on travel preference profile for a customer. The travel preference profile can be constantly updated, including during the actions of the customer in selecting the suitable flight itineraries.

In some embodiments, the method can include receiving inputs from a customer to search for flights itineraries; displaying a flight matrix of the search result, wherein the flight matrix is configured to show categories of flights and ranges of categories, wherein elements of the matrix are organized based on a travel preference profile of the customer; updating the travel preference profile based on characteristics of actions of the customer in selecting a suitable flight itinerary among the displayed flights itineraries.

In some embodiments, the present invention discloses a method for obtaining one suitable flight itinerary, or at most a small number of suitable flight itineraries, from a prioritization scheme based on travel preference profile for a customer. The travel preference profile can be constantly updated, including during the actions of the customer in selecting the suitable flight itineraries.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   forming, by a platform, a database comprising travel preference profiles of multiple users,
     wherein a profile of the travel preference profiles comprises a log of actions in transactions associated with a user of the multiple users, together with indications of user travel preferences based on the user actions;
   receiving a flight search request from the user;
   displaying a flight search result, with the flight search result comprising multiple flight itineraries resulted from the flight search request,
     wherein there are two formats for displaying the flight search result, with the flight search result configured to be displayable in a flight matrix format or a flight itinerary format,
     wherein the flight matrix format is configured to show multiple flight elements configured in different flight categories in a first dimension and either different ranges or values of the flight categories in a second dimension,
     wherein the flight itinerary format is configured to show a list of the multiple flight itineraries, and
     wherein each of the flight matrix format and the flight itinerary format comprises a command selectable by a first action of the user for switching between the formats;
   receiving a user input comprising a second action of the user comprising a selection of a flight element in the flight matrix format or a flight itinerary in the flight itinerary format, with the selection of a flight element in the flight matrix format characterized by removing at least a different flight element in the flight matrix if there is no flight itinerary meeting both the different flight element and the selected flight element;
   updating the display of the flight search result after the user input, with the selection of the flight element in the flight matrix removing the at least a different flight element in the flight matrix;
   generating an indication of a travel preference of the user based on at least the first and second actions; and
   modifying a level of the preference in the profile of the user in the database with the user travel preference indication.

2. The method of claim 1, wherein the indications of the travel preferences are generated by a first artificial intelligent algorithm characterizing the actions of the user according to user travel preference patterns.

3. The method of claim 1, wherein the flight matrix is sorted with only a portion of the flight matrix is shown based on the indications of the user travel preferences.

4. The method of claim 1, further comprising:
   updating, by the platform, the profile with information about the first and second actions of the user.

5. The method of claim 1, wherein:
   the travel preference indication is further generated based on a delay time between two consecutive user inputs, or
   the travel preference indication is further generated based on an action of rearranging the flight categories.

6. A computer-implemented method comprising:
   forming, by a platform, a profile of a user for assisting the user in selecting a travel plan,
   wherein the profile comprises a log of actions in transactions associated with the user, together with indications of user travel preferences,
   wherein the actions are obtained during a process of the user selecting a flight itinerary of multiple flight itineraries, with the multiple flight itineraries resulted from a flight search result presented to the user based on a flight search request from the user,
   wherein there are two formats for displaying the flight search result, with the flight search result configured to be displayable in a flight matrix format or a flight itinerary format,
   wherein the flight matrix format is configured to show multiple flight elements configured in different flight categories in a first dimension and either different ranges or values of the flight categories in a second dimension, wherein the flight itinerary format is configured to show a list of the multiple flight itineraries, wherein the actions comprise a switching action of the user between the flight matrix format and the flight itinerary format using a command displayed together with the flight matrix format and the flight itinerary format, wherein the actions comprise a selection of a flight element in the flight matrix format or a flight itinerary in the flight itinerary format, wherein after the selection action of the flight element, the display of the flight search result is updated to remove at least a different flight element in the flight matrix with the removed different flight element indicating that there is no flight itinerary meeting both the different flight element and the selected flight element, and wherein the indications of the user travel preferences are generated based on the actions of the user.

7. The method of claim 6, wherein the indications of the travel preferences are generated by an artificial intelligent algorithm characterizing the actions of the user according to patterns of the user travel preferences.

8. The method of claim 6, wherein at least one element of the flight matrix is configured to show that there is not a flight itinerary of the multiple flight itineraries meeting the flight category and the range or value of the at least one element.

9. The method of claim 6, wherein the actions further comprise a deselection of a flight element in the flight matrix format or a flight itinerary in the flight itinerary format, and wherein after the deselection action of the flight element, the display of the flight search result is updated with flight itineraries meeting the deselected flight element removed from the flight matrix format.

10. The method of claim 6, wherein the profile further comprises information related to the user and collected by the platform, with the profile comprising at least one of a password, a PIN number, secret questions, or a numerical sequence, possession comprising at least one of a mobile phone, wearable devices, a token, or a smartcard, inherent feature comprising at least one of fingerprint, voice recognition, iris recognition, or facial features, data from agencies or institutions, data supplied by the user including data supplied to the platform by the user comprising email address or billing address, or data inferred from communication between the user and the platform, comprising at least one of location or communication equipment used by the user.

11. The method of claim 6, wherein the indications of the user travel preferences are further generated based on a delay time between two consecutive user inputs.

12. The method of claim 6, wherein when the actions comprise a selection of the flight itinerary in the flight itinerary format for browsing or for booking or purchasing, the indications of the user travel preferences are generated with an increase in the preference associated with a flight element involved in the selected flight itinerary, with the increase in the browsed flight itinerary lower than the increase in the booked or purchased flight itinerary.

13. The method of claim 6, wherein:

when the actions comprise a selection of the flight element in the flight matrix format, the indications of the user travel preferences are generated with an increase in the preference associated with the flight element, or when the actions comprise a deselection of the flight element in the flight matrix format, the indications of the user travel preferences are generated with a decrease in the preference associated with the flight element.

14. The method of claim 6, wherein:

the travel preference indication is generated further based on an action of replacing a first flight element in the flight matrix format with a second flight element in the flight matrix format, and in the replacement action, the indications of the user travel preferences are generated with an increase in the preference associated with the second element and a decrease in the preference associated with the first element.

15. The method of claim 6, wherein when the selection of a flight element comprises an AND or an OR selection of multiple flight elements in the flight matrix format, the indications of the user travel preferences are generated with an increase in the preference associated with the multiple flight elements, or when the deselection of a flight element comprises an AND or an OR deselection of multiple flight elements in the flight matrix format, the indications of the user travel preferences are generated with a decrease in the preference associated with the multiple flight elements.

16. A computer-implemented method comprising:

generating indications of travel preferences of a user by an artificial intelligent algorithm using a log of actions in a profile of the user, wherein the log of actions comprises user actions in transactions associated with the user, wherein the artificial intelligent algorithm is configured to characterize the actions of the user according to user travel preference patterns, wherein the actions are obtained during a process of the user selecting a flight itinerary of multiple flight itineraries, with the multiple flight itineraries resulted from a flight search result presented to the user based on a flight search request from the user, wherein there are two formats for displaying the flight search result, with the flight search result configured to be displayable in a flight matrix format or a flight itinerary format, wherein the flight matrix format is configured to show multiple flight elements configured in different flight categories in a first dimension and either different ranges or values of the flight categories in a second dimension, wherein the flight itinerary format is configured to show a list of the multiple flight itineraries, wherein the actions comprise a switching action of the user between the flight matrix format and the flight itinerary format using a command displayed together with the flight matrix format and the flight itinerary format, wherein the actions comprise a selection or a deselection of a flight element in the flight matrix format or a flight itinerary in the flight itinerary format, wherein after the selection action of the flight element, the display of the flight search result is updated to remove at least a different flight element in the flight matrix with the removed different flight element indicating that there is no flight itinerary meeting both the different flight element and the selected flight element, and wherein after the deselection action of the flight element, the display of the flight search result is updated with flight itineraries meeting the deselected flight element removed from the flight matrix format.

17. The method of claim 16, further comprising receiving a flight search request from the user;

sorting a flight search result, with the flight search result comprising multiple flight itineraries resulted from the flight search request, and wherein the sorting of the multiple flight itineraries is performed by a second artificial intelligent algorithm selecting flight itineraries among the multiple flight itineraries that are mostly suitable to the user based on the travel preference indications of the user.

18. The method of claim 16, wherein the indications of the user travel preferences are further generated based on a delay time between two consecutive user inputs.

19. The method of claim 16, wherein:

the indications of the user travel preferences comprise levels of the travel preferences, and when the actions comprise a selection of the flight itinerary in the flight itinerary format for browsing or for booking or purchasing, the levels of the preferences are modified to comprise an increase in a preference associated with a flight element involved in the selected flight itinerary, with the increase in the browsed flight itinerary lower than the increase in the booked or purchased flight itinerary.

20. The method of claim 16, wherein:

the indications of the user travel preferences comprise levels of the travel preferences, and when the action comprises a selection or a deselection of the flight element in the flight matrix format, the levels of the preferences are modified to comprise an increase or a decrease, respectively, in a preference associated with the flight element.

\* \* \* \* \*